(12) United States Patent
Leigh et al.

(10) Patent No.: US 9,900,101 B2
(45) Date of Patent: Feb. 20, 2018

(54) TRANSCEIVER MODULE

(75) Inventors: Kevin B. Leigh, Houston, TX (US); George D. Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 115 days.

(21) Appl. No.: 14/391,336

(22) PCT Filed: Apr. 30, 2012

(86) PCT No.: PCT/US2012/035765
§ 371 (c)(1),
(2), (4) Date: Oct. 8, 2014

(87) PCT Pub. No.: WO2013/165344
PCT Pub. Date: Nov. 7, 2013

(65) Prior Publication Data
US 2015/0180578 A1   Jun. 25, 2015

(51) Int. Cl.
*H04B 10/40* (2013.01)
*G02B 6/42* (2006.01)

(52) U.S. Cl.
CPC .......... *H04B 10/40* (2013.01); *G02B 6/4246* (2013.01); *G02B 6/4284* (2013.01); *G02B 6/4292* (2013.01); *G02B 6/4293* (2013.01); *H04Q 2213/1301* (2013.01); *H04Q 2213/13003* (2013.01)

(58) Field of Classification Search
CPC .................................. H04B 10/40; H04B 10/43
See application file for complete search history.

(56) References Cited

U.S. PATENT DOCUMENTS

| | | |
|---|---|---|
| 6,588,943 B1 | 7/2003 | Howard |
| 7,636,506 B2 | 12/2009 | Fricker |
| 8,083,547 B2 | 12/2011 | Roth et al. |
| 2002/0097462 A1 | 7/2002 | Koyano et al. |
| 2002/0105966 A1 | 8/2002 | Patel et al. |
| 2003/0012485 A1 | 1/2003 | Neeley et al. |
| 2003/0193972 A1 | 10/2003 | Pitio |
| 2006/0147215 A1* | 7/2006 | Hahin .............. H04B 10/801 398/135 |
| 2009/0296352 A1* | 12/2009 | Lima ............... H05K 1/0207 361/711 |
| 2010/0260503 A1* | 10/2010 | Zhovnirovsky ...... H04B 10/803 398/118 |
| 2011/0182191 A1* | 7/2011 | Jackson .............. H04L 12/2697 370/250 |
| 2012/0051490 A1* | 3/2012 | Hussain .................. G06F 21/86 377/15 |

FOREIGN PATENT DOCUMENTS

| | | |
|---|---|---|
| KR | 100941694 | 2/2010 |
| WO | WO-2009117907 | 10/2009 |

OTHER PUBLICATIONS

International Searching Authority, The International Search Report and the Written Opinion, dated Jan. 2, 2013, 8 Pages.

* cited by examiner

*Primary Examiner* — Dzung Tran
(74) *Attorney, Agent, or Firm* — Fabian VanCott

(57) ABSTRACT

An optical/electrical signal transmission system (100) comprises a number of processing devices (106) mounted on a motherboard (104), and a number of transceiver modules (102) comprising a number of e/o engines (304), in which the transceiver modules (102) electrically couple to the processing devices (106) without interrupting the processes of the system (100).

15 Claims, 13 Drawing Sheets

TRANSCEIVER MODULE

BACKGROUND

Network switches are computer hardware devices that direct and perform a number of services to serve the needs of users of the other computing devices on a network. These network switches comprise a motherboard with switch ASICs and a number of e/o engines (electrical/optical signal converters) communicatively coupled to the motherboard in order to convert electrical signals into optical signals, and visa versa.

A number of optical cables are coupled between these e/o engines and a number of optical connectors in order to transmit optical signals to and from the e/o engines. In some applications, e/o engines are part of the external optical cables. In some other applications, e/o engines are modularly pluggable in faceplate mounted electrical connectors and the external optical cables are plugged into the e/o engines. Replacing the e/o engines will then require removal of the external optical cables, replacement of the e/o engines, and then reinstallation of the external optical cables on the replaced e/o engines. New types of e/o engines are emerging that are integrated on the switch motherboard, and optically couple to internal optical cables that are in turn coupled to the faceplate mounted optical connectors. External optical cables are then coupled to the faceplate mounted optical connectors. E/o engines have higher failure rates than other components within switches. When these e/o engines are integrated within a network switch, the network switch will have a lower reliability. Also, the internal optical cables are often difficult to manage, and can inhibit the flow of cooling air past the e/o engines and other integrated circuits. Further, if an e/o engine is replaced, complications may arise out of the possibility that the individual optical cables may be damaged during removal, or re-coupled to the wrong components within the network switch.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
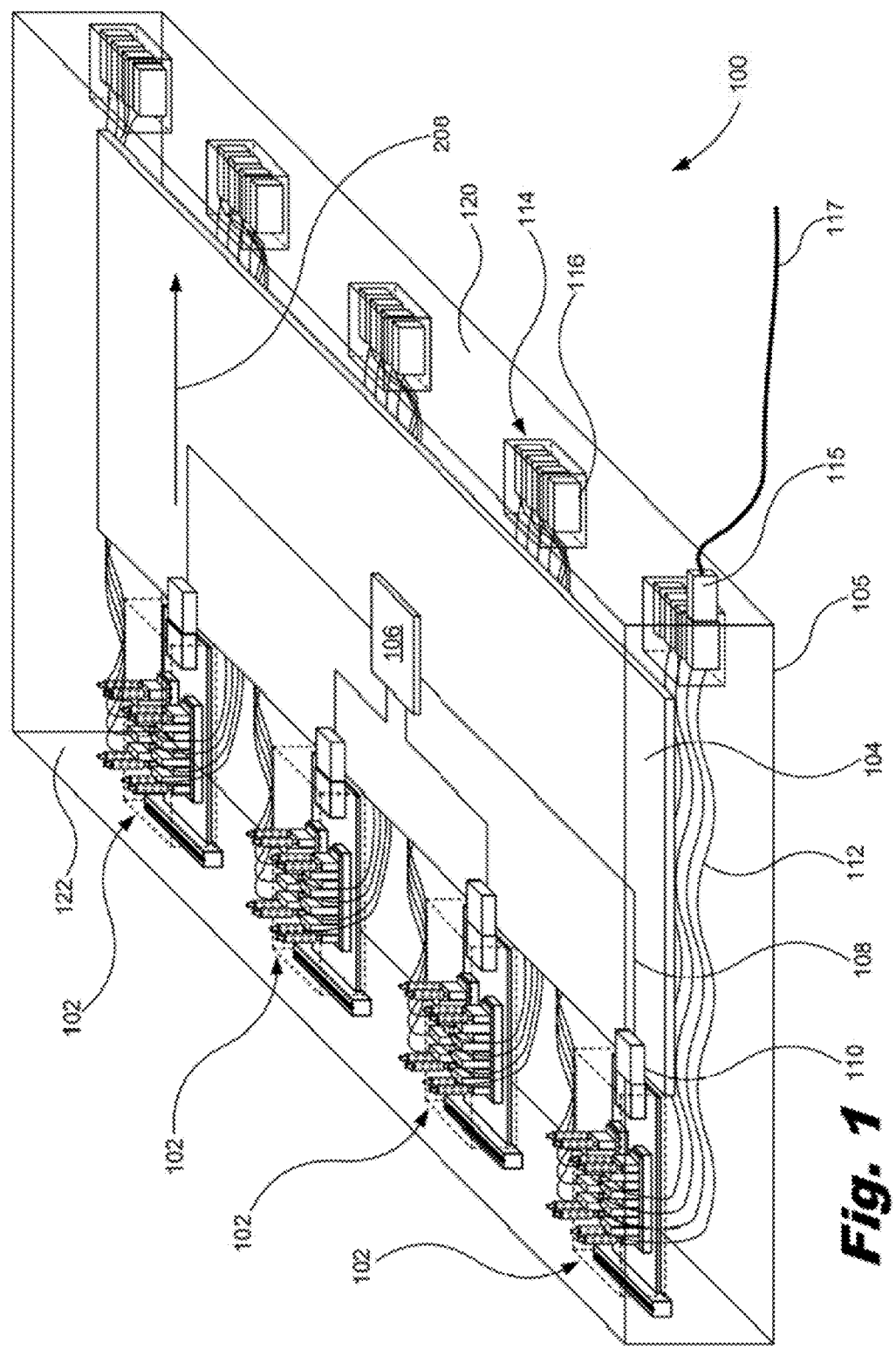
FIG. 1 is a perspective view of a switch module comprising a number of transceiver modules coupled to a switch motherboard, according to one example of the principles described herein.

When integrated on a printed circuit board (PCB) along with other processing devices, e/o engines may have lower lifetime reliability than the processing devices. Servicing a failed e/o engine integrated within, for example, a switch module may include removing or destroying other components within the switch module. Further, integrating e/o engines within a switch module may increase costs because users may eventually purchase a larger switch module with more communication ports when such a large switch module was not needed at that time.

Further, when servicing a computing device such as, for example, a switch module, a number of connectivity failure conditions may be induced by the user or technician. These connectivity failure conditions may occur when servicing optical cables or transceiver modules within the switch module where cables are removed before servicing the transceiver modules. Further, incorrectly identified cables and transceiver modules can be removed and connectivity services can be unintentionally interrupted during such a servicing.

E/o engines may be integrated within a switch module by placing the e/o engines on or very close to a switch application specific integrated circuit (ASIC). E/o engines may generally have lower lifetime reliability than the switch ASICs. Therefore, embedding the e/o engines along with switch ASICs within a switch module may decrease the lifetime of the switch module and its reliability. In addition, placing e/o engines close to higher heat devices such as switch ASICs accelerates the failure rate of the e/o engines.

The present application discloses an optical/electrical signal transmission system comprising a number of processing devices mounted on a motherboard, and a number of transceiver modules comprising a number of e/o engines, in which the transceiver modules electrically couple to the processing devices without interrupting the processes of the system. The e/o engines convert optical signals into electrical signals, and electrical signals into optical signals when optical and electrical connections are made. Further, a transceiver module comprises a number of e/o engines to electrically couple to a number of processing devices mounted on a motherboard and optically couple to a number of waveguides, in which the e/o engines electrically couple to the processing devices mounted on a motherboard and optically couple to a number of waveguides The transceiver module is hot-swappable without the removal of a number of external waveguides.

As used in the present specification and in the appended claims, the terms "e/o engine" or "transceiver module" is meant to be understood broadly as any computer hardware device that converts electrical signals into optical signals, optical signals into electrical signals, or both. In one example, an e/o engine may receive an optical or electrical signal from a first computing device, convert that signal into either an electrical signal or an optical signal, and transmit that converted signal to a second computing device.

As used in the present specification and in the appended claims, the term "hot swappable," "hot serviceable," or "hot pluggable" are meant to be understood broadly as a characteristic of computing device components that can be replaced without shutting down the computing device. In another example, hot swappable may describe the ability to replace computing device components without interruption to the computing device. In another example, hot pluggable may describe the addition of computing device components that would expand the computing device without significant interruption to the operation of the computing device.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Throughout this disclosure, a switch module is used as the implemented computing device. However, the implemented computing device may include any device, component, or subcomponent that processes data. Examples of the implemented computing device may include a server, a blade server, a computer blade, a storage blade, a switch module, and a personal computer, among others.

FIG. 1 is a perspective view of a switch module (100) comprising a number of transceiver modules (102) coupled to a switch motherboard (104), according to one example of the principles described herein. The switch module (100) may be any device that transmits data and may be housed in a housing (105). For convenience in describing the various elements of the switch module (100), the housing (105) is transparently depicted. However, the housing (105) may be made of any material of any level of transparency or opacity. In one example, the switch module (100) is a network switch that connects network segments or network devices. In another example, the switch module is a server such as a database server, a file server, a mail server, a print server, or a web server, among others.

The switch motherboard (104) comprises a number of switch application specific integrated circuits (ASIC) (106). The switch ASICs (106) transmit electrical signals to and from the transceiver modules (102) via a number of conductive pathways (108) and motherboard electrical blind mate connectors (110). In one example, each transceiver module (102) communicatively coupled to a switch ASIC (106) is coupled thereto by a number of the conductive pathways (108) and motherboard electrical blind mate connectors (110).

The transceiver modules (102) comprise various elements that allow for the conversion of optical signals received at the switch module (100) into electrical signals that may be utilized by various integrated circuits such as, the switch ASICs (106). With this architecture, the transceiver modules (102) can also convert electrical signals transmitted from, for example, the ASICs (106) into optical signals. Thus, the transceiver modules (102) comprise e/o engines as defined above and as will be described in more detail in connection with FIG. 3. In order to transmit optical signals to and from the switch module (100), the transceiver modules (102) are optically coupled to a number of internal waveguides (112). In one example, these internal waveguides (112) are optical fibers.

The internal waveguides (112) terminate at a number of ferrule arrays (114) comprising a number of ferrules (116) on the rear faceplate (120) of the switch module (100). The ferrules (116) of the ferrule arrays (114) provide for optical coupling of the switch module (100) to other computing devices on a network. In one example, the ferrules (116) are blind mate connectors in which the mating of the ferrules (116) to external ferrules (115) that are terminated on the external waveguides (117) running to the switch module (100) from an external device comprises self-aligning features that ensure a predetermined alignment of the waveguides when mating.

As will be described in more detail below, the transceiver modules (102) are independently serviceable with respect to the switch ASICs (106). Further, the transceiver modules (102) can be removed and replaced without altering the switch module (100) or its switch motherboard (104). Even still further, the transceiver modules (102) are pluggable modules to be independently serviceable without removing corresponding internal waveguides (112). Even still further, the transceiver modules (102) allow multiple internal waveguides (112) to be supported by a pluggable transceiver module (102). The same type of transceiver modules (102) can be used in connection with various types of faceplate mounted optical connectors, including, for example, optical blind-mate backplane connectors, and other faceplate connectors of various configurations. Even still further, the transceiver modules (102) are hot swappable, hot pluggable, or combinations thereof.

Figure 2:
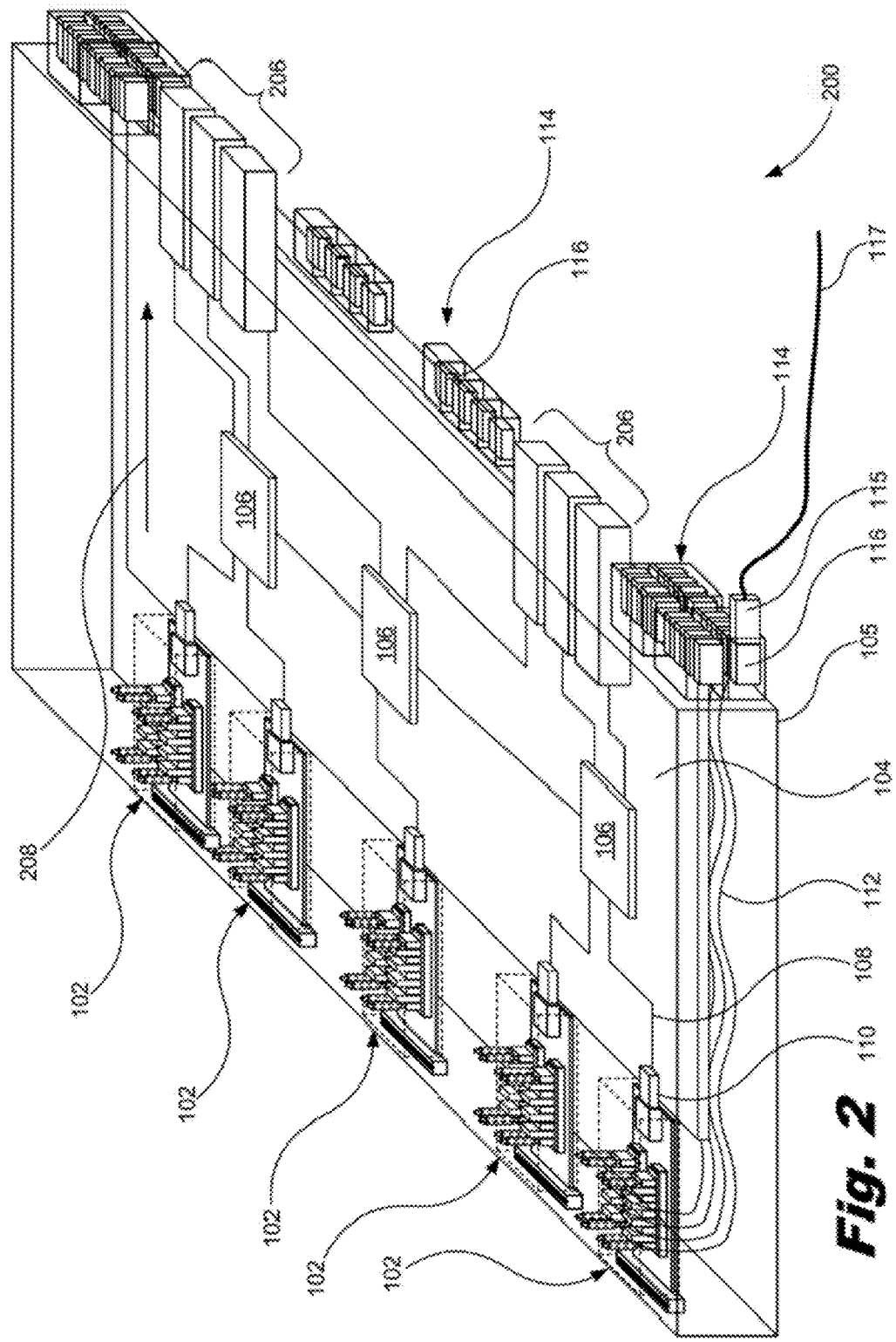
FIG. 2 is a perspective view of a switch module comprising a number of transceiver modules coupled to a switch motherboard, according to another example of the principles described herein.

Even still further, as depicted in FIGS. 1 and 2, the transceiver modules (102) may be located at a front portion of the switch module (100). In one example, cooling air used to cool the various processing elements of the switch module (100) may flow from the left to the right as depicted with arrow (208) in FIGS. 1 and 2. In this manner, the cooling air flows from the front of the switch module (100) to the back, cooling elements such as, for example, the transceiver modules (102) and switch ASICs (106). In one example, a number of fans (not shown) may be placed between the transceiver modules (102) just inside the front faceplate (122) of the switch module. The positioning of the transceiver modules (102) at the front of the switch module (100) allows a user or technician to access the transceiver modules (102) in order to replace them, add more transceiver modules (102) or reduce the number of transceiver modules (102) within the switch module (100), without touching the cables mounted on the optical connectors that are, in turn, mounted on the switch rear faceplate.

FIG. 2 is a perspective view of a switch module (200) comprising a number of transceiver modules (102) coupled to a switch motherboard (104), according to another example of the principles described herein. The switch module (200) of FIG. 2 comprises a number of transceiver modules (102), a housing (105) (transparently depicted), a number of ferrule arrays (114) comprising a number of ferrules (116) at an edge of the switch module (200), and a number of motherboard electrical blind mate connectors (110) for electrically coupling the transceiver modules (102) to the switch motherboard (104). Although not depicted in FIG. 2, the switch module (200) also comprises a number of internal waveguides (112) that optically couple the transceiver modules (102) to the ferrules (116) as depicted in FIG. 1. The internal waveguides (112) are not depicted in order to lend simplicity to FIG. 2 and in order to more easily understand the various elements of FIG. 2.

The switch module (200) also comprises a number of switch ASICs (106). In the example of FIG. 2, there are three switch ASICs (106). These switch ASICs (106) are electrically coupled to the transceiver modules (102) via the motherboard electrical blind mate connectors (110) and a number of the conductive pathways (108). The switch module (200) of FIG. 2 may further comprise a number of faceplate connectors (206) to optically couple the switch module (200) to exterior computing devices. In one example, the faceplate connectors (206) may include faceplate connectors (206) comprising a number of e/o engines to which external optical waveguides (117) may couple. In another example, the faceplate connectors (206) may not comprise an e/o engine. In this example, the faceplate connectors (206) are configured to accept an external waveguide (117) comprising an e/o engine, or an e/o engine that is configured to couple the faceplate connectors (206) to an external waveguide (117).

The external waveguides (117) of FIG. 2 may be coupled to the ferrules (116) of the ferrule arrays (114) via an external ferrule (115). Only one external ferrule (115) and external waveguide (117) are depicted in FIG. 2. However, any number of external ferrule (115) and external waveguide (117) pairs may be coupled to the switch module (200). The external waveguides (117) transmit optical signals from an external computing device to the switch module (200).

In the example of FIG. 2, and throughout the disclosure, the transceiver modules (102) are hot-swappable and can be removed, replaced, or serviced independent of the external waveguides (117). In this example, the external waveguides (117) do not have to be removed from the switch module (200) in order to insert or remove the transceiver modules (102). Therefore, if an e/o engine (FIG. 3, 304) within the transceiver modules (102) need to be removed, serviced, or replaced then the transceiver modules (102) may be removed, serviced, or replaced without having to remove the external waveguides (117) from the switch module (200).

This is in contrast to the faceplate connectors (206) that have a number of e/o engines (not shown). The conductive pathways (108) and switch ASICs (106) are electrically coupled to the e/o engines within the faceplate connectors (206). The e/o engines within faceplate connectors (206) are optically coupled to an external waveguide (117). If the e/o engines within the faceplate connectors (206) are serviced, then the external waveguide (117) optically coupled to the e/o engines within the faceplate connectors (206) must be removed to access the e/o engines within the faceplate connectors (206). Thus, an advantage of the transceiver modules (102) described throughout this disclosure is that if an e/o engine within the transceiver modules (102) are serviced, the external waveguide (117) does not need to be removed.

As depicted in FIGS. 2, the e/o engines in the faceplate connectors (206) are located on the switch motherboard (104), and are placed at the rear side of the switch motherboard (104). This placement of the e/o engines in the faceplate connectors (206) with respect to the switch motherboard (104) causes the e/o engines in the faceplate connectors (206) to receive preheated air of the switch ASICs (106) since the switch ASICs (106) produce heat during operation. Because various components within computing devices such as the switch module (100) produce heat during operation, a number of these components within the switch module (100) may be subjected to relatively higher operating temperatures that may cause those components to fail sooner.

To improve the reliability of the components of the switch module (100), the transceiver modules (102) are placed on the front faceplate (122) and at a distance from the switch ASICs (106). In this manner, the transceiver modules (102) receive the fresh cool air. Although the switch ASICs (106) receive the heated air from the transceiver modules (102), these transceiver modules consume much lower power than the switch ASICs (106) and thus generate relatively less heat. Further, because the switch ASICs (106) have higher lifetime reliability than the e/o engines in the transceiver modules (102), the switch module (100) may be configured in this manner.

Further, as depicted in FIG. 1, the internal waveguides (112) that optically couple the ferrules (116) with the transceiver modules (102) are not located above the switch motherboard (104), but, instead run below the switch motherboard (104). In this manner, the internal waveguides (112) also do not obstruct the flow of air across the switch ASICs (106) and switch motherboard (104).

Still further, the transceiver modules (102) are replaceable. In one example, the transceiver modules (102) are hot swappable, hot pluggable, or combinations thereof. Still further, the ability to replace the individual transceiver modules (102) allows the switch module (100) to continue to operate without significant interruption to the processes of the switch module (100). Even still further, any number of transceiver modules (102) may be added to the switch module (100) in order to expand the switch module's (100) ability to transmit data without a significant interruption to the operation of the switch module (100).

Further, in one example, a layperson with no experience in removal or replacement of e/o engines or transceiver modules (102) with in a network device such as, for example, the switch module (100) can remove or replace the transceiver modules (102). In this example, the transceiver modules (102) may be classified as field replaceable units (FRUs). An FRU is a component or assembly of components that can be removed from a computing device or other piece of electronic equipment, and replaced by a user or a technician without having to send the entire product or system to a repair facility or destroying other components of the computing device.

Figure 3:
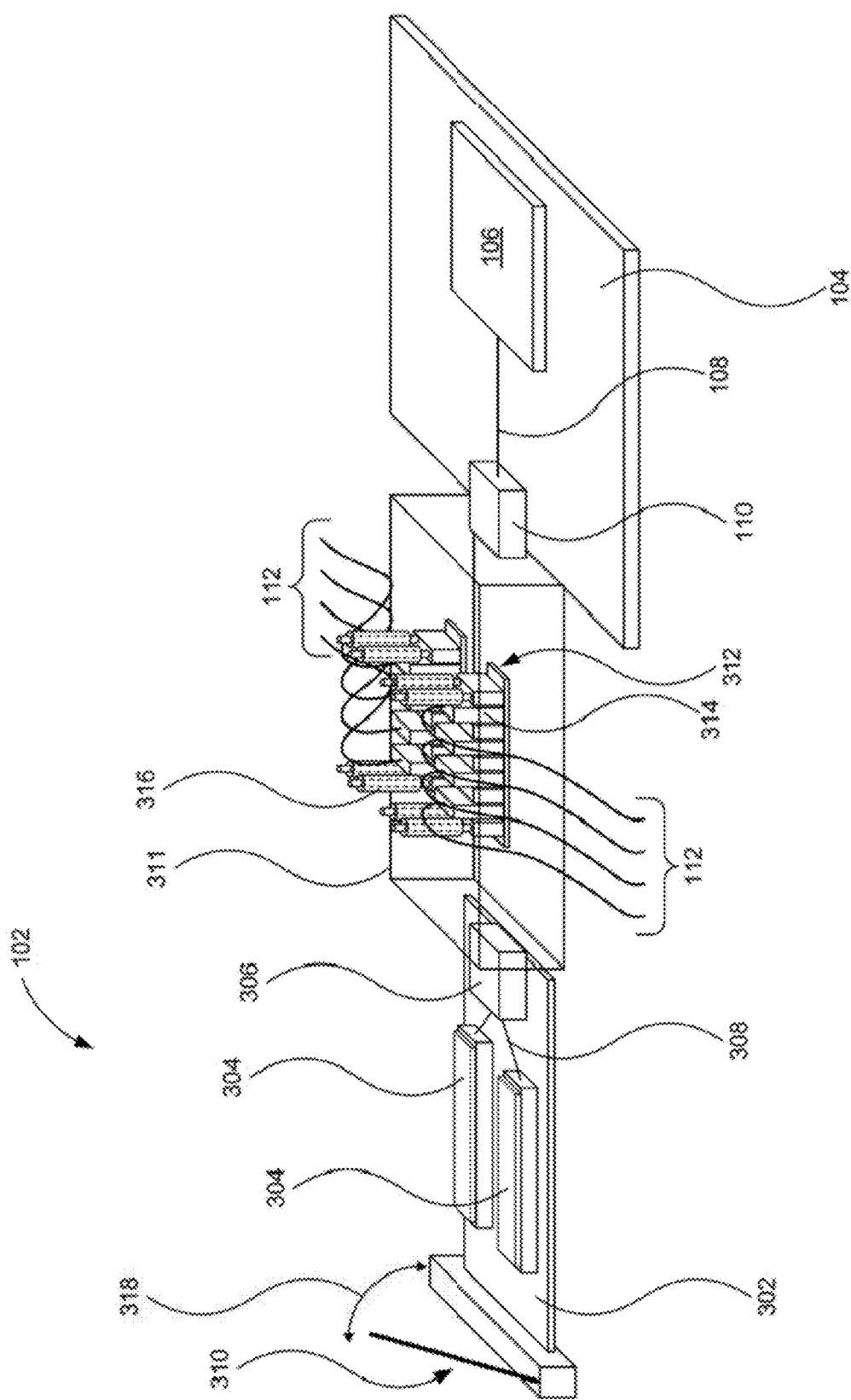
FIG. 3 is a perspective view of a transceiver module in a disengaged arrangement with respect to a switch motherboard, according to an example of the principles described herein.

FIG. 3 is a perspective view of a transceiver module (102) in a disengaged arrangement with respect to a switch motherboard (104), according to an example of the principles described herein. As depicted in FIG. 3, the transceiver module (102) comprises a substrate (302), a number of e/o engine arrays (304), a transceiver electrical blind mate connector (306), and a number of conductive pathways (308) electrically coupling the e/o engine arrays (304) to the transceiver electrical blind mate connector (306). The transceiver module (102) further comprises a latching device (310) to couple the transceiver module (102) to the switch motherboard (104).

In order to couple, house, and mount the transceiver module (102) with respect to the motherboard (104), the motherboard (104) comprises a transceiver module housing (311). The motherboard (104) further comprises a number of ferrule arrays (312) comprising a number of ferrules (314) to transmit optical signals from the ferrules (116) of FIG. 1 to the of e/o engine arrays (304) via the internal waveguides (112). A number of heat sinks (316) may be coupled to the ferrule arrays (312) to draw heat from the e/o engine arrays (304) after they are engaged. The heat sinks (316) may also be utilized as vertical guides on the transceiver module housing (311) to guide the movement of the ferrule arrays (312) to engage with the e/o engine arrays (304). In one example, the ferrule arrays (312), ferrules (314), and heat sinks (316) are coupled to the transceiver module housing (311) in a predefined orientation in order to align the various elements of the transceiver module (102) with the various elements of the motherboard (104) as will now be described.

The transceiver module housing (311) assists in aligning the transceiver electrical blind mate connector (306) and the motherboard electrical blind mate connector (110) during insertion of the transceiver module (102) into the transceiver module housing (311). Further, the transceiver module housing (311) assists in aligning the ferrule arrays (312) to the e/o engine arrays (304). As described above, the transceiver module (102) further comprises the latching device (310) to couple the transceiver module (102) to the motherboard (104). In one example, the latching device (310) on the transceiver module (102) may be any device capable of activating another latching device (not shown) in the transceiver module housing to couple the transceiver electrical blind mate connector (306) to the motherboard electrical blind mate connectors (110) and the ferrule arrays (312) to the e/o engine arrays (304) in series. In this example, the transceiver module (102) electrically couples to the motherboard (104) via the transceiver electrical blind mate connector (306) and the motherboard electrical blind mate connectors (110) before the transceiver module (102) optically couples to the motherboard (104) via the e/o engine arrays (304) and ferrule arrays (312).

In another example, the latching device (310) may be any device capable of coupling the transceiver electrical blind mate connector (306) to the motherboard electrical blind mate connector (110) and coupling the e/o engine arrays (304) to the ferrule arrays (312) in series. In still another example, the latching device (310) may couple the transceiver module (102) to the transceiver module housing (311) before, after, or simultaneously with respect to the coupling of the transceiver electrical blind mate connector (306) to the motherboard electrical blind mate connectors (110) and the e/o engine arrays (304) to the ferrule arrays (312).

The latching device (310) may be, for example, a spring-loaded lever that, when pushed in the direction of arrow (318) may cause a number of locks to protrude out of the transceiver module (102) and into the transceiver module housing (311) when the transceiver module (102) is correctly mounted in the transceiver module housing (311). However, any coupling device may be used as the latching device (310).

Figure 4:
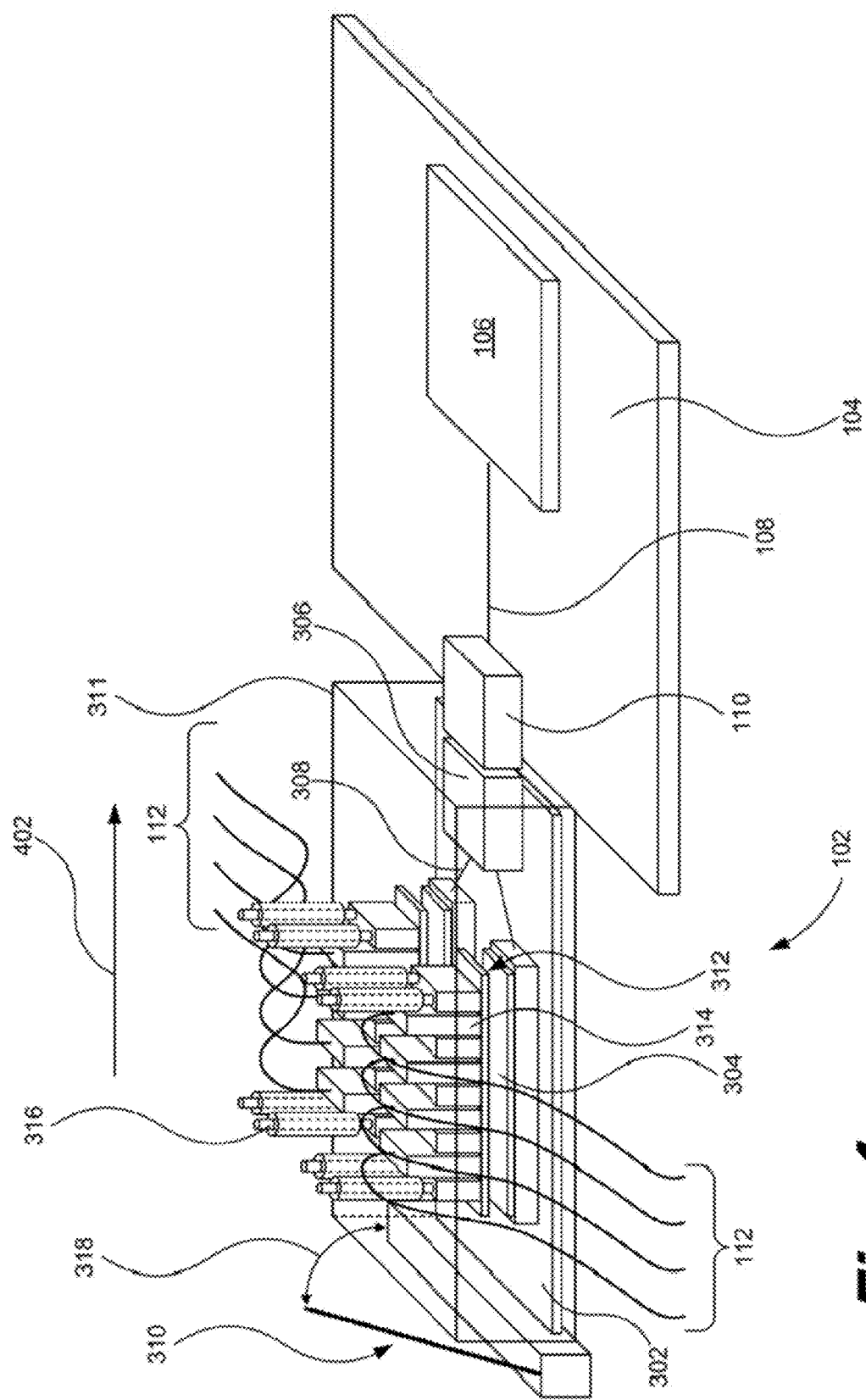
FIG. 4 is a perspective view of the transceiver module in a partially engaged arrangement with respect to the switch motherboard of FIG. 3, according to an example of the principles described herein.

FIG. 4 is a perspective view of the transceiver module (102) in a partially engaged arrangement with respect to the switch motherboard (104) of FIG. 3, according to an example of the principles described herein. The transceiver module (102) is pushed into the transceiver module housing (311). In one example, the action of pushing the transceiver module (102) into the transceiver module housing (311) as indicated by arrow (402) electrically couples the transceiver electrical blind mate connector (306) to the motherboard electrical blind mate connector (110). In another example, the electrical coupling of the transceiver electrical blind mate connector (306) to the motherboard electrical blind mate connector (110) does not occur until a later stage of mounting, as will be described in more detail below.

Figure 5:
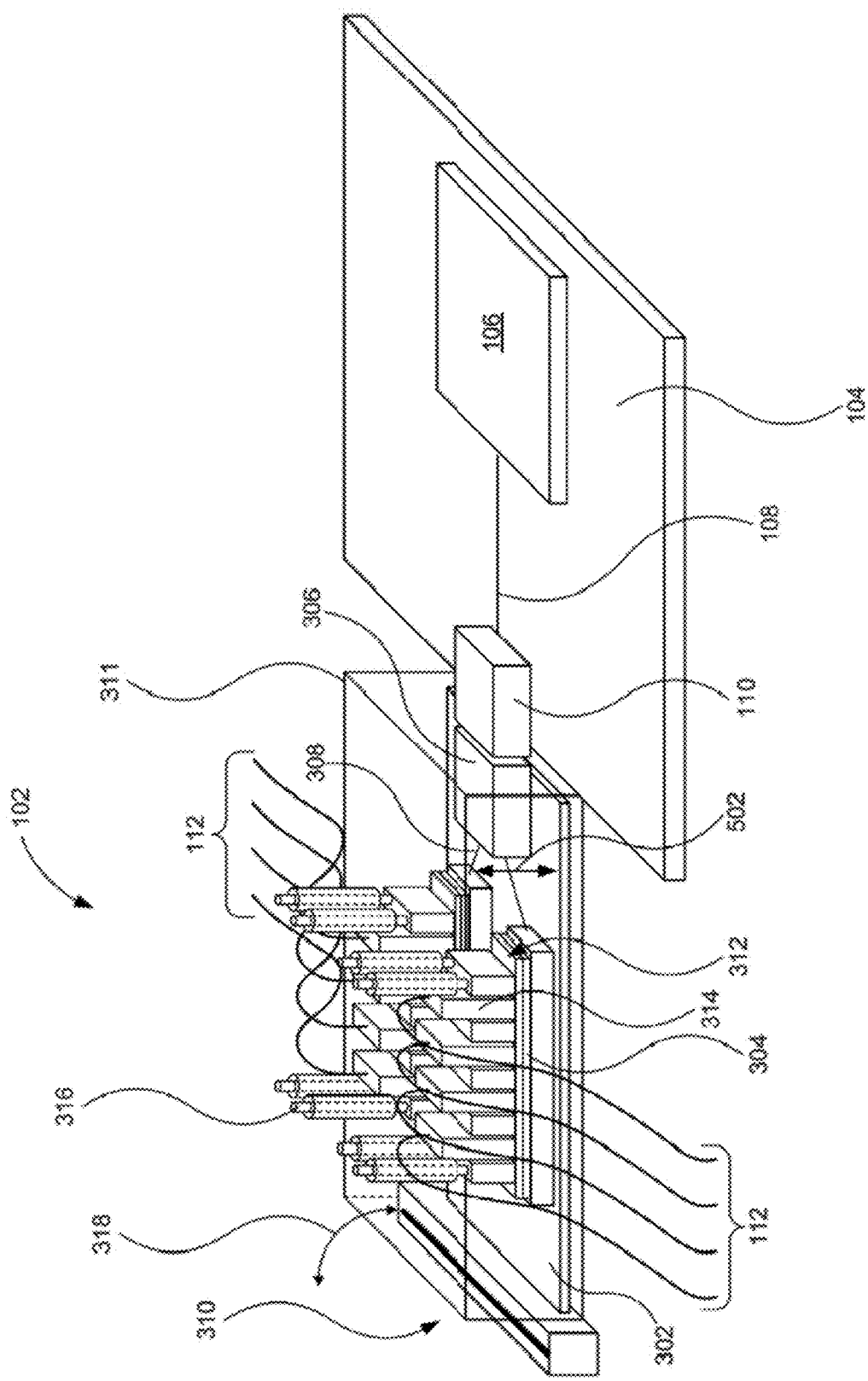
FIG. 5 is a perspective view of the transceiver module in an engaged arrangement with respect to the switch motherboard of FIG. 3, according to an example of the principles described herein.

Turning to the next figure, FIG. 5 is a perspective view of the transceiver module (102) in an engaged arrangement with respect to the switch motherboard (104) of FIG. 3, according to an example of the principles described herein. As depicted in FIG. 5, the latching device (310) is in an engaged position as indicated by arrow (318). In one example, during engagement of the latching device (310), the transceiver module (102) is forced in the direction of arrow (502). In this example, the latching device (310) activates a number of latching devices (not shown) within the transceiver module housing (311) that moves the ferrule arrays (312) vertically into communicative engagement with the e/o engine arrays (304) of the transceiver module (102). The latching devices of the transceiver module housing (311) may be any mechanical device that positions the ferrule arrays (312) into communicative engagement with the e/o engine arrays (304) of the transceiver module (102) upon engagement of the latching device (310).

In another example, the latching device (310) moves the e/o engine arrays (304) of the transceiver module (102) vertically into communicative engagement with the ferrule arrays (312). The carriage may be any mechanical device that positions the e/o engine arrays (304) of the transceiver module (102) into communicative engagement with the ferrule arrays (312) upon engagement of the latching device (310).

In another example, during engagement of the latching device (310), the ferrule arrays (312) are forced in the direction of arrow (502) via a number of magnetic connectors. In this example, a number of magnets are coupled to the e/o engine arrays (304). A number of corresponding magnets are coupled to the ferrule arrays (312). In this example, before or after the latching device (310) is engaged, the magnets coupled to the e/o engine arrays (304) and the magnets coupled to the ferrule arrays (312) attract. In this manner, the magnets move the ferrule arrays (312) vertically into communicative engagement with the e/o engine arrays (304) of the transceiver module (102). The above magnetic coupling may be implemented in order to couple the transceiver electrical blind mate connector (306) to the motherboard electrical blind mate connector (110) in a similar manner In another example, during engagement of the latching device (310), the transceiver module (102) is forced in the direction of arrow (502) via a number of magnetic connectors. In this example, a number of magnets are coupled to the e/o engine arrays (304). A number of corresponding magnets are coupled to the ferrule arrays (312). In this example, before or after the latching device (310) is engaged, the magnets coupled to the e/o engine arrays (304) and the magnets coupled to the ferrule arrays (312) attract. In this manner, the magnets move the e/o engine arrays (304) of the transceiver module (102) vertically into communicative engagement with the ferrule arrays (312). The above magnetic coupling may be implemented in order to couple the transceiver electrical blind mate connector (306) to the motherboard electrical blind mate connector (110) in a similar manner.

In still another example, the latching device (310) engages the transceiver electrical blind mate connector (306) with the motherboard electrical blind mate connector (110) simultaneously or substantially simultaneously as the latching device (310) engages the e/o engine arrays (304) with the ferrule arrays (312). In this example, although the transceiver electrical blind mate connector (306) and the motherboard electrical blind mate connectors (110) may be horizontally aligned due to the right edge of the transceiver electrical blind mate connector (306) and the left edge of the motherboard electrical blind mate connectors (110) being positioned on the same vertical plane, they may not be vertically aligned in a manner in which electrical communication may take place. Thus, in this example, the engagement of the latching device (310) electrically engages the transceiver electrical blind mate connector (306) with the motherboard electrical blind mate connector (110) simultaneously or substantially simultaneously as the latching device (310) optically engages the e/o engine arrays (304) with the ferrule arrays (312).

Figure 6A:
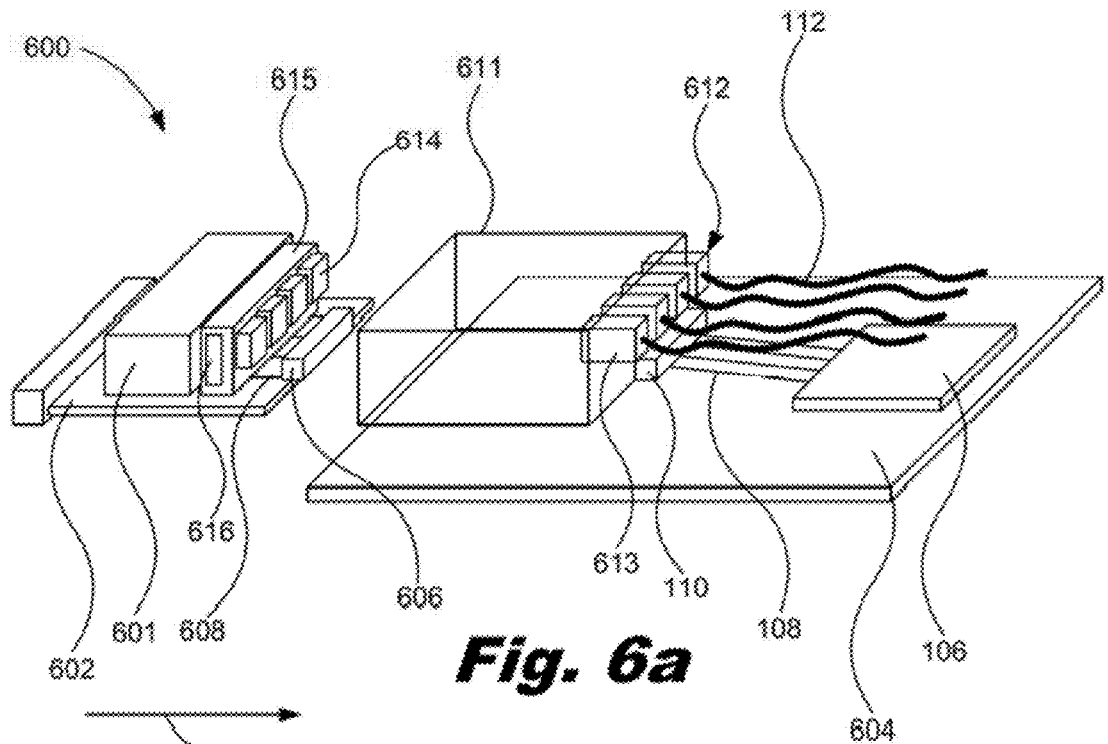
FIG. 6a is a perspective view of a transceiver module in a disengaged arrangement with respect to a switch motherboard, according to another example of the principles described herein.
Figure 6B:
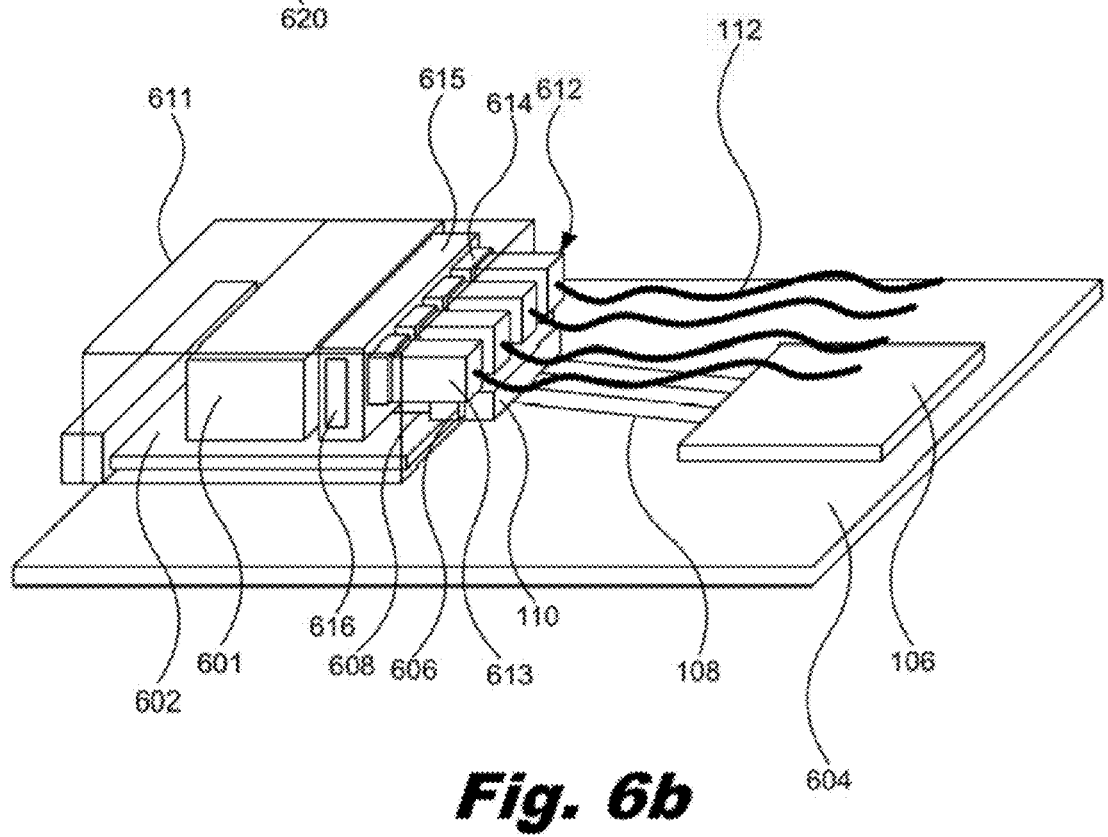
FIG. 6b is a perspective view of the transceiver module in an engaged arrangement with respect to the switch motherboard of FIG. 6a, according to an example of the principles described herein.

FIG. 6a is a perspective view of a transceiver module (600) in a disengaged arrangement with respect to a switch motherboard (604), according to another example of the principles described herein. In the example of FIGS. 6a and 6b, the electrical coupling and optical coupling are achieved along the same axis. The transceiver module (600) of FIGS. 6a and 6b comprises a substrate (602), a support block (601) disposed on the substrate (602), a number of e/o engines (614), and a flex circuit (615) electrically coupled to the e/o engines (614). The number of e/o engines (614) depicted in FIGS. 6a and 6b is four. However, any number of e/o engines (614) may be included within the transceiver module (600).

The transceiver module (600) may also comprise a heat sink (616) thermally coupled to the flex circuit (615). The heat sink (616) may be exposed to cooling air flows to cool the transceiver module (600). A number of conductive pathways (608) may be disposed on the substrate (602) to electrically couple the flex circuit (615) to a transceiver electrical blind mate connector (606).

The switch motherboard (604) comprises a number of switch ASICs (106) electrically coupled to a number of motherboard electrical blind mate connectors (110) via a number of conductive pathways (108). The motherboard electrical blind mate connectors (110) are coupled to a transceiver module housing (611). Further, a ferrule array (612) comprising a number of ferrules (613) are coupled to a transceiver module housing (611). A number of internal waveguides (112) are optically coupled to the ferrules (613) to provide transmission of optical signals to and from the transceiver module (600).

The transceiver module (600) is mounted to the transceiver module housing (611) by moving the transceiver module (600) into the transceiver module housing (611) in the direction of arrow (620). The transceiver module (600) is physically coupled to the transceiver module housing (611) via any number of coupling methods. In one example, an interference fit may be formed between the transceiver module (600) and the transceiver module housing (611). In another example, a coupling device located on the transceiver module (600) or the transceiver module housing (611) is used to mechanically connect the transceiver module (600) to the transceiver module housing (611). In this example, the coupling device may be, for example, clamps, clips, screws, and snaps, among others.

FIG. 6b is a perspective view of the transceiver module (600) in an engaged arrangement with respect to the switch motherboard (604) of FIG. 6a, according to an example of the principles described herein. Once coupled to the switch motherboard (604), the transceiver module (600) receives optical signals from an outside source via the ferrules (613) of the ferrule array (612) and internal waveguides (112). The optical signals are converted into electrical signals by the e/o engines (614). The electrical signals are transmitted to the transceiver electrical blind mate connector (606) via the flex circuit (615) and conductive pathways (608). The motherboard electrical blind mate connector (110) of the switch motherboard (604) receives the electrical signals from the transceiver electrical blind mate connector (606). The conversion of electrical signals from the switch motherboard (604) to an outside device is performed in reverse.

As described above, the transceiver module (600) of FIGS. 6a and 6b allows for simultaneous optical and electrical coupling of the transceiver module (600) to the switch motherboard (604). Also, the optical and electrical coupling of the transceiver module (600) to the switch motherboard (604) occurs along the same axis.

Figure 7A:
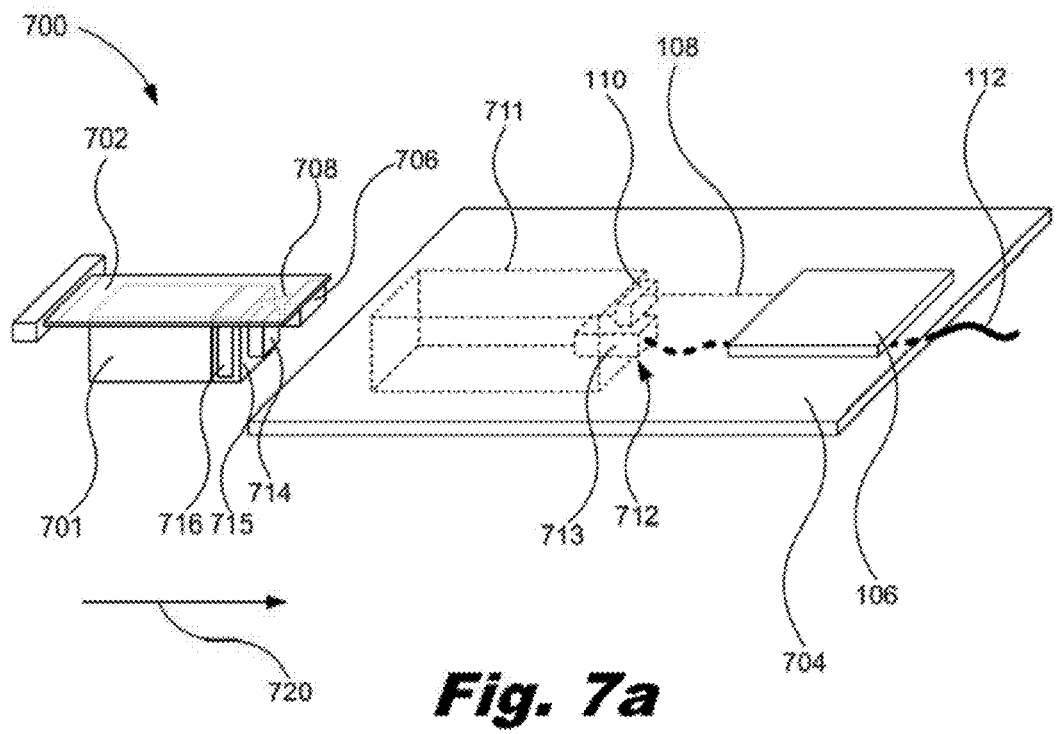
FIG. 7a is a perspective view of a transceiver module in a disengaged arrangement with respect to a switch motherboard, according to still another example of the principles described herein.
Figure 7B:
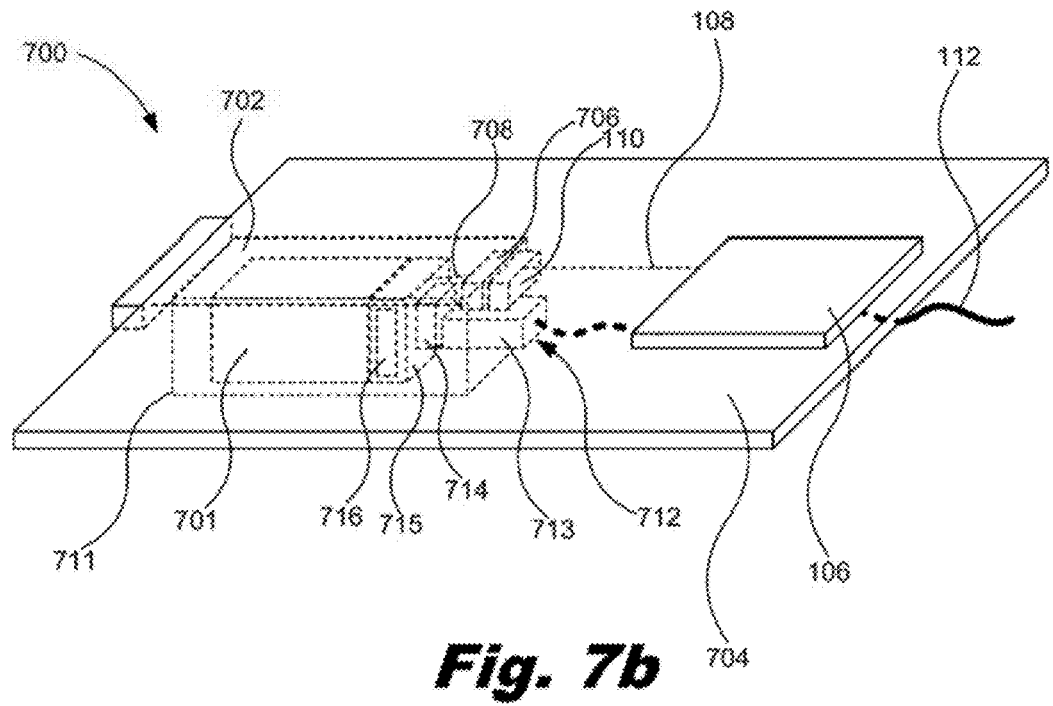
FIG. 7b is a perspective view of the transceiver module in an engaged arrangement with respect to the switch motherboard of FIG. 7a, according to an example of the principles described herein.

FIG. 7a is a perspective view of a transceiver module (700) in a disengaged arrangement with respect to a switch motherboard (704), according to still another example of the principles described herein. FIG. 7b is a perspective view of the transceiver module (700) in an engaged arrangement with respect to the switch motherboard (704) of FIG. 7a, according to an example of the principles described herein. FIGS. 7a and 7b are similar to FIGS. 6a and 6b, except that the transceiver module (700) is mounted under the switch motherboard (704). In the example of FIGS. 7a and 7b, the electrical coupling and optical coupling of the transceiver module (700) to the switch motherboard (704) are achieved along the same axis as similarly described in connection with FIGS. 6a and 6b.

The transceiver module (700) of FIGS. 7a and 7b comprises a substrate (702), a support block (701) disposed on the substrate (702), a number of e/o engines (714), and a flex circuit (715) electrically coupled to the e/o engines (714). The number of e/o engines (714) depicted in FIGS. 7a and 7b is one. However, any number of e/o engines (714) may be included within the transceiver module (700).

The transceiver module (700) may also comprise a heat sink (716) thermally coupled to the flex circuit (715). A number of conductive pathways (708) may be disposed on the substrate (702) to electrically couple the flex circuit (715) to a transceiver electrical blind mate connector (706).

The switch motherboard (704) comprises a number of switch ASICs (106) electrically coupled to a number of motherboard electrical blind mate connectors (110) via a number of conductive pathways (108). The motherboard electrical blind mate connectors (110) are coupled to a transceiver module housing (711). Further, a ferrule array (712) comprising a number of ferrules (713) are coupled to a transceiver module housing (711). The number of ferrules (713) depicted in FIGS. 7a and 7b is one. However, any number of ferrules (713) may be included within the transceiver module (700).

A number of internal waveguides (112) are optically coupled to the ferrules (713) to provide transmission of optical signals to and from the transceiver module (700). The motherboard electrical blind mate connector (110), conductive pathway (108), transceiver module housing (711), ferrule (713), and internal waveguide (112) of FIG. 7 are shown as dashed lines because they are disposed on the underside of the switch motherboard (704).

The transceiver module (700) is mounted to the transceiver module housing (711) by moving the transceiver module (700) into the transceiver module housing (711) in the direction of arrow (720). As described above in connection with FIGS. 6a and 6b, the transceiver module (700) is physically coupled to the transceiver module housing (711) via any number of coupling methods. In one example, an interference fit may be formed between the transceiver module (700) and the transceiver module housing (711). In another example, a coupling device located on the transceiver module (700) or the transceiver module housing (711) is used to mechanically connect the transceiver module (700) to the transceiver module housing (711). In this example, the coupling device may be, for example, clamps, clips, screws, and snaps, among others.

Once coupled to the switch motherboard (704), the transceiver module (700) receives optical signals from an outside source via the ferrule (713) of the ferrule array (712) and internal waveguide (112). The optical signals are converted into electrical signals by the e/o engines (714). The electrical signals are transmitted to the transceiver electrical blind mate connector (706) via the flex circuit (715) and conductive pathways (708). The motherboard electrical blind mate connector (110) of the switch motherboard (704) receives the electrical signals from the transceiver electrical blind mate connector (706). The conversion of electrical signals from the switch motherboard (704) to an outside device is performed in reverse.

As described above, the transceiver module (700) of FIGS. 7a and 7b allows for simultaneous optical and electrical coupling of the transceiver module (700) to the switch motherboard (704). Also, the optical and electrical coupling of the transceiver module (700) to the switch motherboard (704) occurs along the same axis.

As depicted in FIGS. 7a and 7b, the transceiver module (700) is mounted on the underside of the switch motherboard (704). In another example, the transceiver module (700) is mounted on a side of the switch motherboard (704) opposite a number of other processing devices such as, for example, a switch ASIC (106). The example of FIGS. 7a and 7b provide for a configuration wherein the internal waveguides (112) are not located above the switch motherboard (704), but, instead run below the switch motherboard (704). In this manner, the internal waveguides (112) do not obstruct the flow of air across the switch ASICs (106), switch motherboard (704), or other heat-sensitive components.

Further, through implementation of the examples of FIGS. 7a and 7b, the top of the switch motherboard (704) is less cluttered. This allows technicians or other persons to access the various components located on the top side of the switch motherboard (704) more easily. Still further, having the internal waveguides (112) run under the switch motherboard (704) can reduce or eliminate human error. For example, if a user wishes to access the switch ASICs (106) located on the top of the switch motherboard (704), and if the internal waveguides (112) run above the switch motherboard (704), a technician may inadvertently destroy a number of internal waveguides (112). Thus, if the internal waveguides (112) do run above the switch motherboard (704), more rugged internal waveguides (112) would be used leading to higher costs in materials and implementation.

Figure 8A:
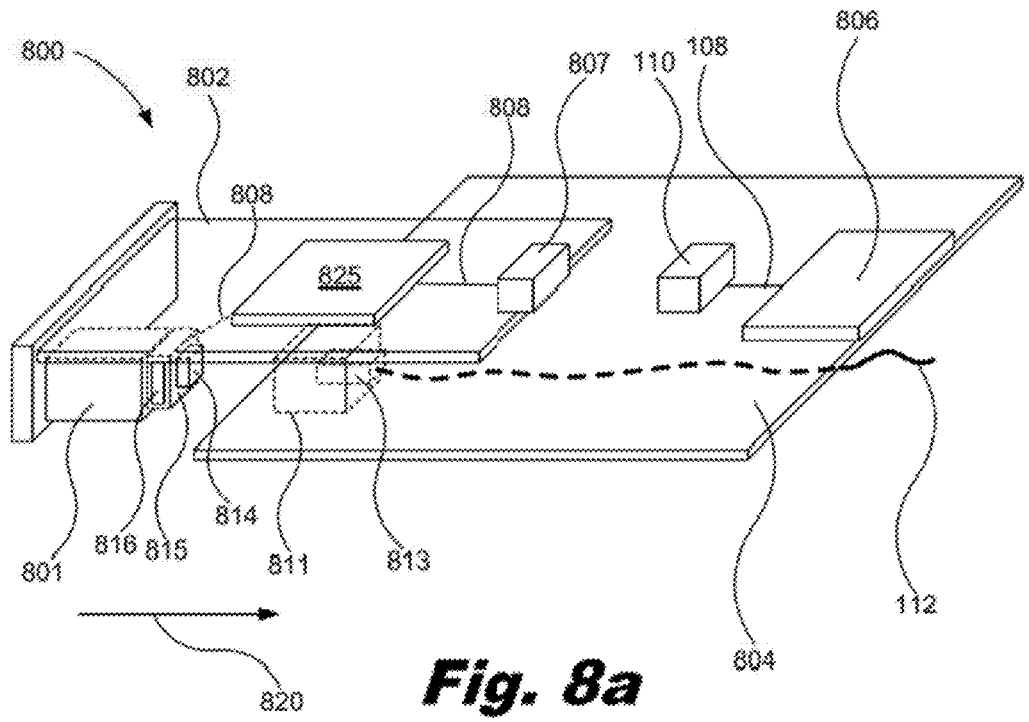
FIG. 8a is a perspective view of a transceiver module in a disengaged arrangement with respect to a switch motherboard, according to still another example of the principles described herein.
Figure 8B:
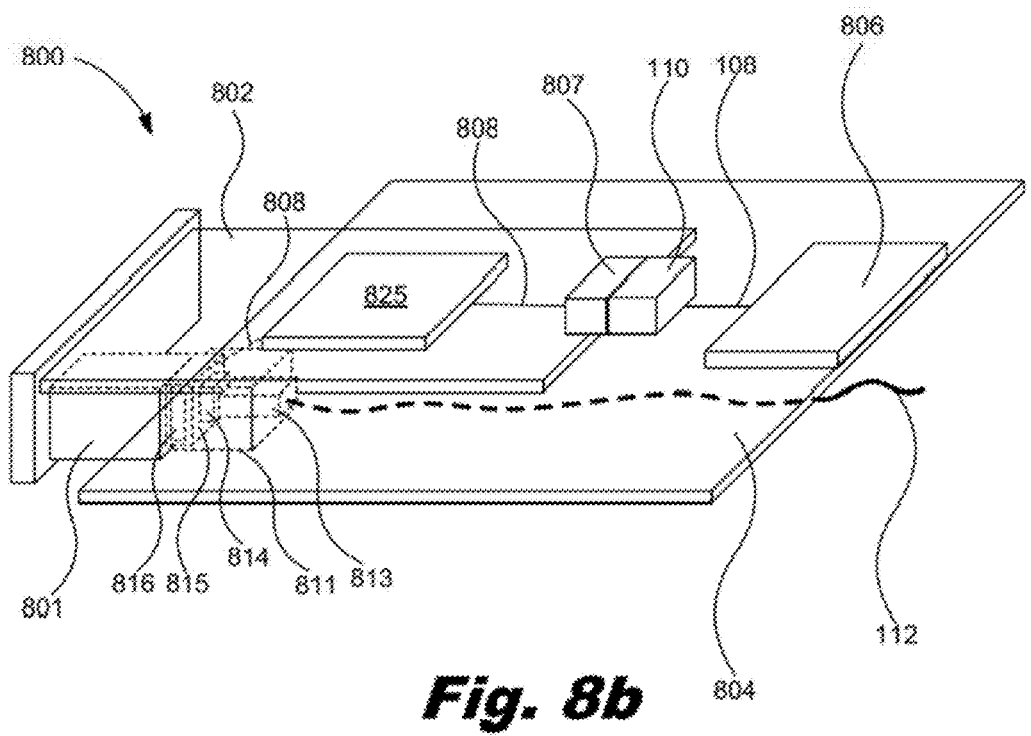
FIG. 8b is a perspective view of the transceiver module in an engaged arrangement with respect to the switch motherboard of FIG. 8a, according to an example of the principles described herein.

FIG. 8a is a perspective view of a transceiver module (800) in a disengaged arrangement with respect to a switch motherboard (804), according to still another example of the principles described herein. FIG. 8b is a perspective view of the transceiver module (800) in an engaged arrangement with respect to the switch motherboard (804) of FIG. 8a, according to an example of the principles described herein. FIGS. 8a and 8b are similar to FIGS. 6a and 6b and FIGS. 7a and 7b, except that the transceiver module (800) of FIGS. 8a and 8b is mounted under the switch motherboard (804) with a leaf switch ASIC (825) electrically coupled to the transceiver module (800). In the example of FIGS. 8a and 8b, the electrical coupling and optical coupling of the transceiver module (800) to the switch motherboard (804) are achieved along the same axis as similarly described in connection with FIGS. 6a and 6b and FIGS. 7a and 7b.

The transceiver module (800) of FIGS. 8a and 8b comprises a substrate (802), a support block (801) disposed on the substrate (802), a number of e/o engines (814), and a flex circuit (815) electrically coupled to the e/o engines (814). The number of e/o engines (814) depicted in FIGS. 8a and 8b is one. However, any number of e/o engines (814) may be included within the transceiver module (800). In one example, the substrate (802) is a line card PCA. In FIGS. 8a and 8b, portions of the support block (801), flex circuit (815), e/o engine (814), and transceiver module housing (811) are depicted in using dashed lines because they are disposed on the underside of the substrate (802) as will be described in more detail below.

The transceiver module (800) may also comprise a heat sink (816) thermally coupled to the flex circuit (815). A number of conductive pathways (808) may be disposed on the substrate (802) to electrically couple the flex circuit (815) to a leaf switch ASIC (825) and the leaf switch ASIC (825) to a transceiver electrical blind mate connector (807). In one example, the leaf switch ASIC (825) is an electrical signal repeater chip that passes electrical signals between components.

The switch motherboard (804) comprises a number of spine switch ASICs (806) electrically coupled to a number of motherboard electrical blind mate connectors (110) via a number of conductive pathways (108). A ferrule (813) is coupled to a transceiver module housing (811). The number of ferrules (813) depicted in FIGS. 8a and 8b is one. However, any number of ferrules (813) may be included within the transceiver module (800).

A number of internal waveguides (112) are optically coupled to the ferrules (813) to provide transmission of optical signals to and from the transceiver module (800). The motherboard electrical blind mate connector (110), conductive pathway (108), transceiver module housing (811), ferrule (813), and internal waveguide (112) of FIGS. 8a and 8b are shown as dashed lines because they are disposed on the underside of the switch motherboard (804).

The transceiver module (800) is mounted to the transceiver module housing (811) by moving the support block (801), e/o engine (814), flex circuit (815), and heat sink (816) into the transceiver module housing (811) in the direction of arrow (820). As described above in connection with FIGS. 6a and 6b and 7a and 7b, the transceiver module (800) is physically coupled to the transceiver module housing (811) via any number of coupling methods. In one example, an interference fit may be formed between the transceiver module (800) and the transceiver module housing (811). In another example, a coupling device located on the transceiver module (800) or the transceiver module housing (811) is used to mechanically connect the transceiver module (800) to the transceiver module housing (811). In this example, the coupling device may be, for example, clamps, clips, screws, and snaps, among others.

Once coupled to the switch motherboard (804), the transceiver module (800) receives optical signals from an outside source via the ferrule (813) and internal waveguide (112). The optical signals are converted into electrical signals by the e/o engines (814). The electrical signals are transmitted to the transceiver module electrical blind mate connector (807) via the flex circuit (815) and conductive pathways (808). The motherboard electrical blind mate connector (110) of the switch motherboard (804) receives the electrical signals from the transceiver electrical blind mate connector (807). The conversion of electrical signals from the switch motherboard (804) to an outside device is performed in reverse.

As described above, the transceiver module (800) of FIGS. 8a and 8b allows for simultaneous optical and electrical coupling of the transceiver module (800) to the switch motherboard (804). Also, the optical and electrical coupling of the transceiver module (800) to the switch motherboard (804) occurs along the same axis. Still further, in the example of FIGS. 8a and 8b the optical coupling of the transceiver module (800) to the ferrule (813), and the electrical coupling of the transceiver module (800) to the motherboard electrical blind mate connector (110) occur on opposite sides of the switch motherboard (804).

As depicted in FIGS. 8a and 8b, a portion of the transceiver module (800) is mounted on the underside of the switch motherboard (804). In another example, the e/o engine (814) of the transceiver module (800) is mounted on a side of the switch motherboard (804) opposite a number of other processing devices such as, for example, the spine switch ASIC (806). The example of FIGS. 8a and 8b provide for a configuration wherein the internal waveguides (112) are not located above the switch motherboard (804), but, instead run below the switch motherboard (804). In this manner, the internal waveguides (112) do not obstruct the flow of air across the spine switch ASICs (806), switch motherboard (804), or other heat-sensitive components. Further, the leaf switch ASIC (825) of FIGS. 8a and 8b is electrically coupled to the switch motherboard (804) on the same side of the switch motherboard (804) that comprises a number of other processing devices such as, for example, the spine switch ASIC (806). In this configuration, the leaf switch ASIC (825) is cooled along with the spine switch ASIC (806). Further, through implementation of the examples of FIGS. 8a and 8b, the top of the switch motherboard (804) is less cluttered, allows access to the various components located on the top side of the switch motherboard (804) more easily, reduces or eliminates human error, and is more cost efficient with regard to materials and implementation as described above.

In the examples of FIGS. 6a through 8b, the transceiver modules (600, 700, 800) optically couple to the motherboard (604, 704, 804) when the e/o engines (614, 714, 814) optically couple to the ferrules (613, 713, 813). In one example, the ferrules (613, 713, 813) may move with respect to the transceiver module housings (611, 711, 811) once they come into contact with the e/o engines (614, 714, 814). In this manner, the e/o engines (614, 714, 814) optically couple to the ferrules (613, 713, 813) before the transceiver modules (600, 700, 800) electrically couple to the motherboard (604, 704, 804) via the motherboard electrical blind mate connectors (110) and transceiver electrical blind mate connector (606, 706, 807). Thus, the optical coupling of the transceiver modules (600, 700, 800) to the motherboard (604, 704, 804) occurs before the transceiver modules (600, 700, 800) electrically couple to the motherboard (604, 704, 804).

Figure 9:
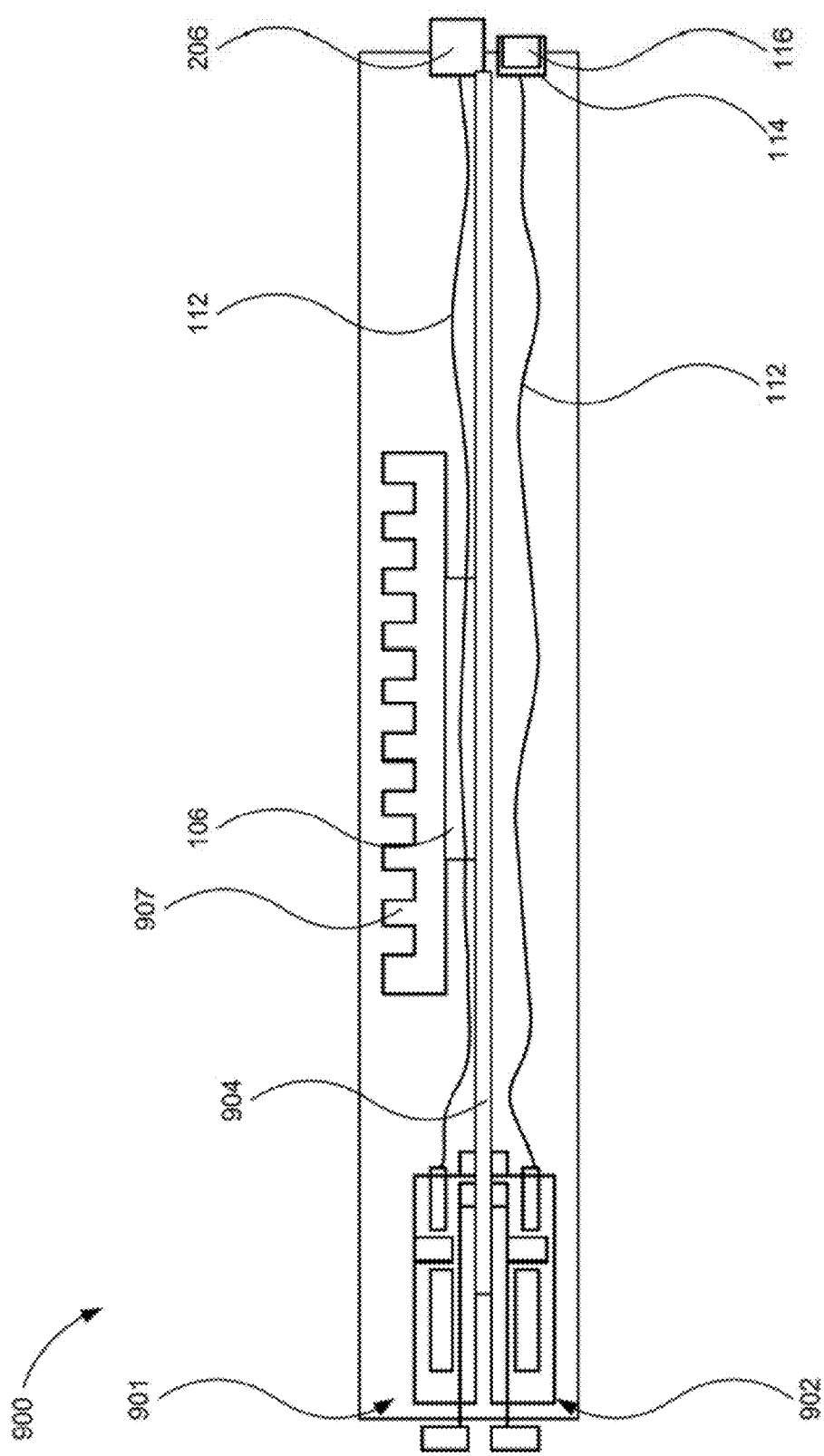
FIG. 9 is a side view of a switch module with a first transceiver module on the top side of the switch motherboard and a second transceiver module on the bottom side of the switch motherboard, according to an example of the principles described herein.

FIG. 9 is a side view of a switch module (900) with a first transceiver module (901) on the top side of the switch motherboard (904) and a second transceiver module (902) on the bottom side of the switch motherboard (904), according to an example of the principles described herein. FIG. 9 depicts an example where the presently disclosed transceiver modules (901, 902) may be implemented to convert electrical signals to optical signals and optical signals to electrical signals, and interfacing to a corresponding number of electrical and optical connectors.

As depicted in FIG. 9, a switch ASIC (106) is mounted on the switch motherboard (904), and a heat sink (907) is mounted on the switch ASIC (106) to assist in the cooling of the switch ASIC (106). A number of faceplate connectors (206) and ferrules (116) may be located at an edge of the switch module (900) to allow outside computing devices to optically couple to the switch module (900) and transfer optical signals to the transceiver modules (901, 902) via a number of internal waveguides (112).

FIG. 9 provides for another example of internal waveguide (112) management wherein some of the internal waveguides (112) are located above the switch motherboard (904) and some of the internal waveguides (112) are located below the switch motherboard (904). In this manner, the number of internal waveguides (112) located above the switch motherboard (904) are reduced. In this example, cooling air can flow across the top of the switch motherboard (904) in a less obstructed manner. In one example, this may be due, in part, to a routing of the internal waveguides (112) in the volume space between the switch ASICs.

Figure 10:
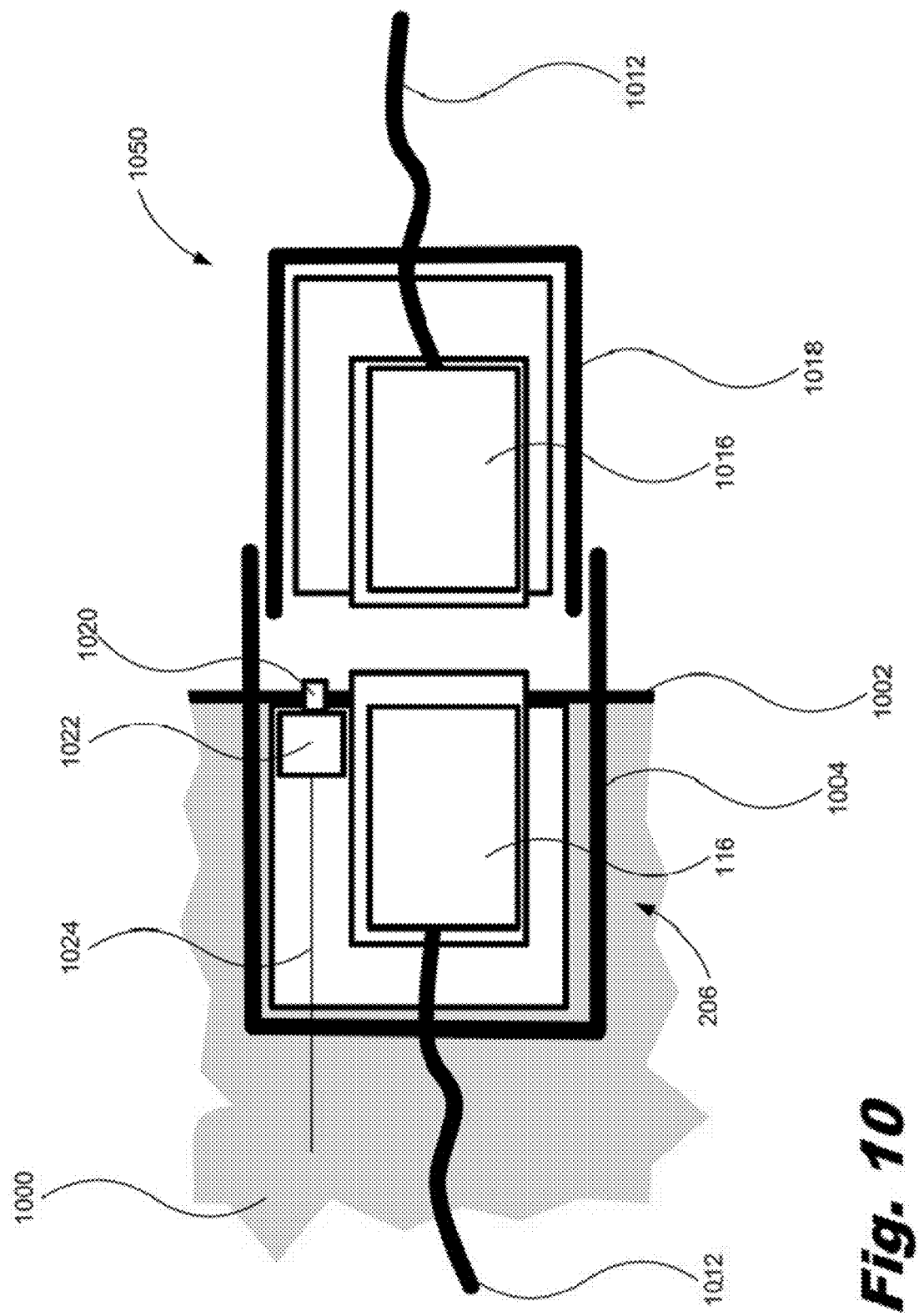
FIG. 10 is a side view of a faceplate connector for communicatively coupling an external optical cable assembly to a switch module that utilizes a connector/cable identification (CID) button, according to an example of the principles described herein.

FIGS. 10 through FIG. 14 depict methods to manage the associations of transceiver modules (102) and external optical cables that may be coupled to the rear faceplate (120). FIGS. 10 through FIG. 14 further depict diagnostic elements associated with detection of presence and function of external waveguides (117) and transceiver modules (102). Beginning with FIG. 10, FIG. 10 is a side view of a faceplate connector (206) for communicatively coupling an external optical cable assembly (1050) to a switch module (1000) that utilizes a connector/cable identification (CID) button (1020), according to an example of the principles described herein. As depicted in FIG. 10, the switch module (1000) comprises a rear faceplate (1002) comprising a number of faceplate connectors (206). A faceplate housing (1004) is coupled to the faceplate (1002), and houses a number of ferrules (116) and a number of connector/cable identification (CID) buttons (1020). FIG. 10 depicts one ferrule (116) and one CID button (1020). However, any number of ferrules (116) and CID buttons (1020) may be arranged in the faceplate (1002) of the switch module (1000).

The CID button (1020) may be used to associate a particular transceiver module (FIG. 1, 102) with its external waveguide (1012). If a particular external waveguide (1012) is disassociated from its assigned or designated transceiver module (FIG. 1, 102), it may be difficult to ensure that that particular external waveguide (1012) is re-associated with the same assigned or designated transceiver module (FIG. 1, 102). This scenario may occur when maintenance is performed on the switch module (1000), and a number of external waveguide (1012) are decoupled from their respective transceiver modules (FIG. 1, 102).

The external optical cable assembly (1050) may comprise a ferrule housing (1018) that houses an external ferrule (1016). A waveguide is optically coupled to the external ferrule (1016), in order to transmit optical signals from an external computing device through the ferrules (116, 2016), and into the switch module (1000).

In one example, the CID button (1020) of the switch module (1000) assists in the indication of the presence of a transceiver module (FIG. 1, 102), external waveguide (1012), or both within or attached to the switch module (1000). The CID button (1020) may be disposed on the faceplate (1002), or, as depicted in FIG. 10, in the faceplate housing (1004).

In one example, the CID button (1020) is actuated when the external optical cable assembly (1050) is fully engaged with the faceplate connectors (206). In this example, a portion of the external optical cable assembly (1050) abuts and actuates the CID button (1020) when the external optical cable assembly (1050) is fully seated within the faceplate connectors (206). In an example where the faceplate connector (206) and external optical cable assembly (1050) are instead electrical connectors for transmitting electrical signals, a number of grounded electrical pins may be used as the CID button (1020) to indicate engagement and identification information. In one example, a number of indicators may be associated with the CID button (1020) to indicate the presence of or identify a number of transceiver modules (FIG. 1, 102), external waveguides (1012), or both. These indicators will now be described in connection with FIGS. 11, 12, and 13.

Figure 11:
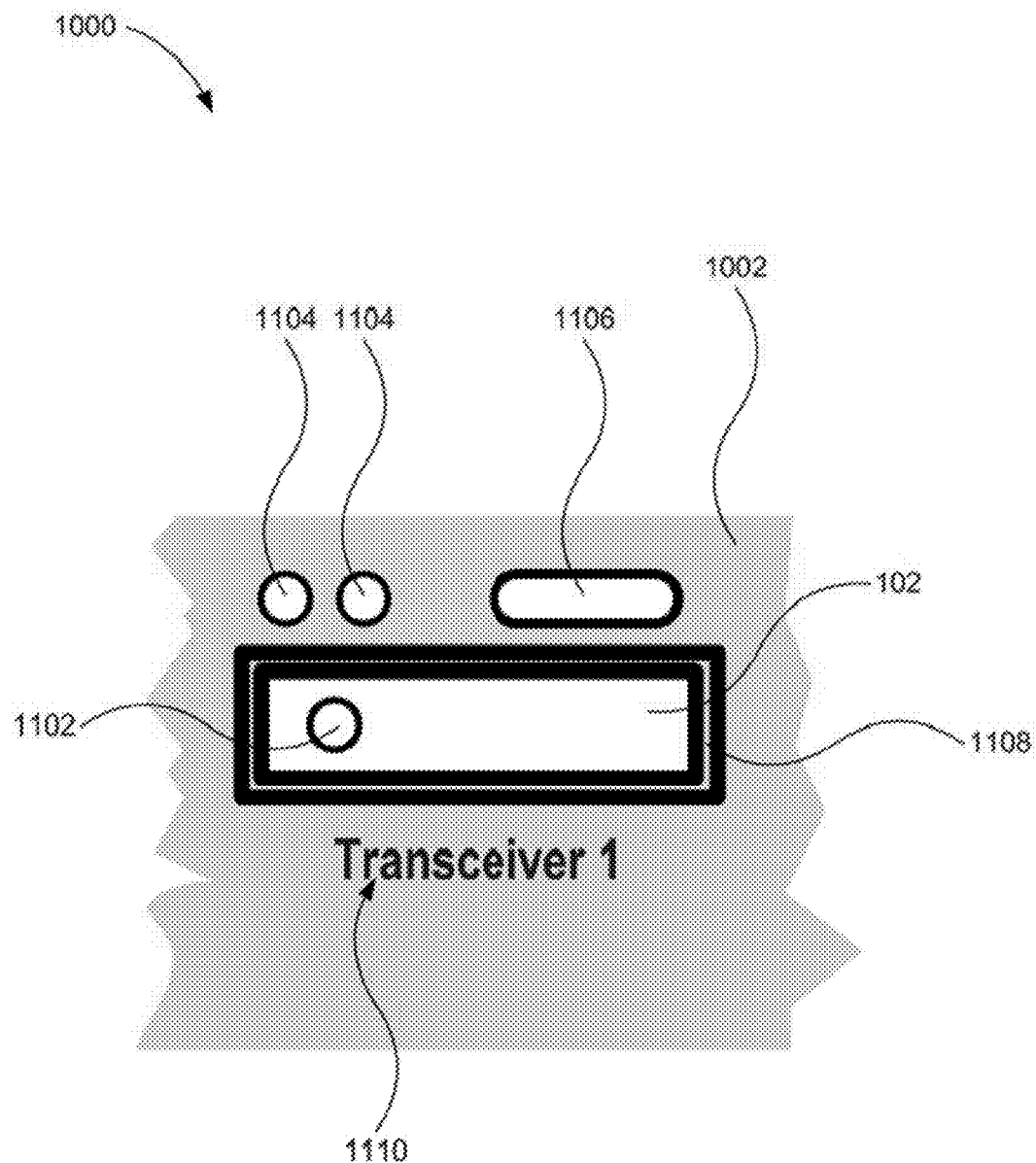
FIG. 11 is a view of a faceplate with a number of user interface elements, according to an example of the principles described herein.

FIG. 11 is a view of a faceplate (1002) with a number of user interface elements, according to an example of the principles described herein. In the example of FIG. 11, the user interface elements located on the faceplate (1002) of the switch module (1000) may include a transceiver module status indicator (1102), a number of cable connection status indicators (1104), a CID button/indicator (1106), CID presence indicator (1108), and a transceiver module label (1110). Further, as depicted in FIG. 11, a transceiver module (102) is engaged within the switch module (1000). In one example, the user interface elements of FIG. 11 may be used to identify a number of connectors, cables, transceiver modules (FIG. 1, 102), external waveguides (1012), or a combination thereof. Further, the user interface elements of FIG. 11 may be used to indicate the operational statuses of a number of connectors, cables, transceiver modules (FIG. 1, 102), external waveguides (1012), or a combination thereof.

Figure 12:
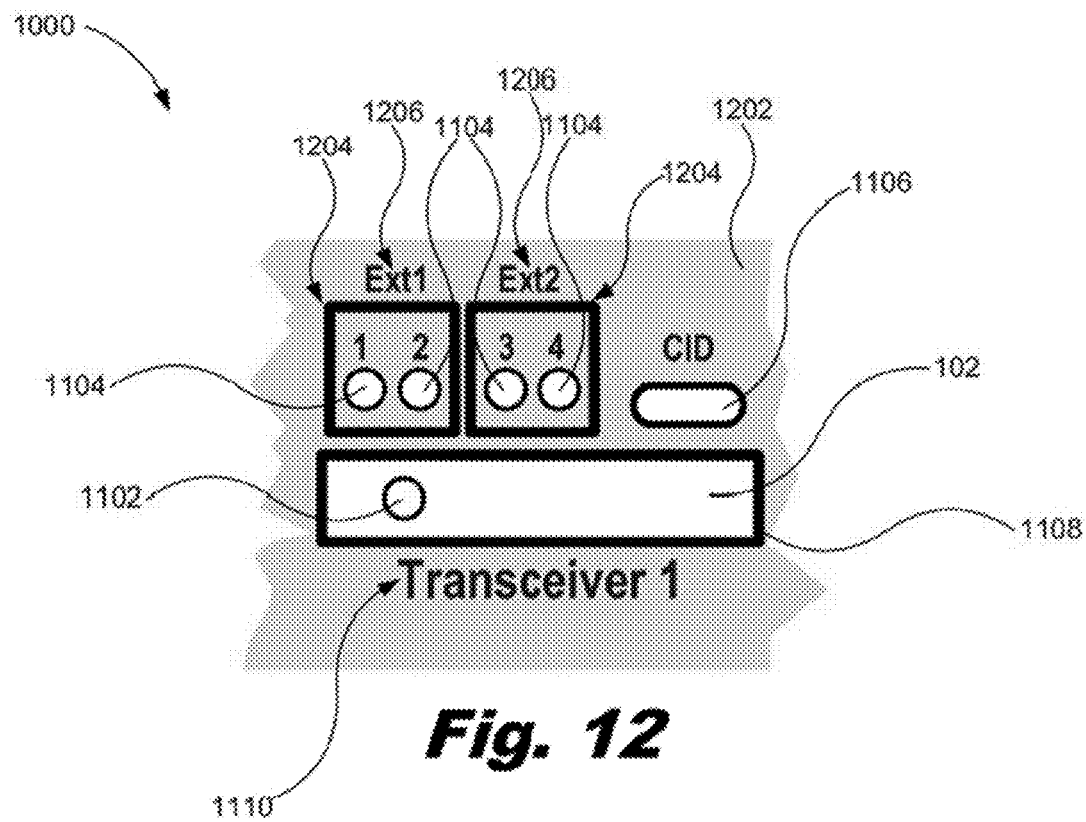
FIG. 12 is a view of a front faceplate with a number of user interface elements, according to another example of the principles described herein.
Figure 13:
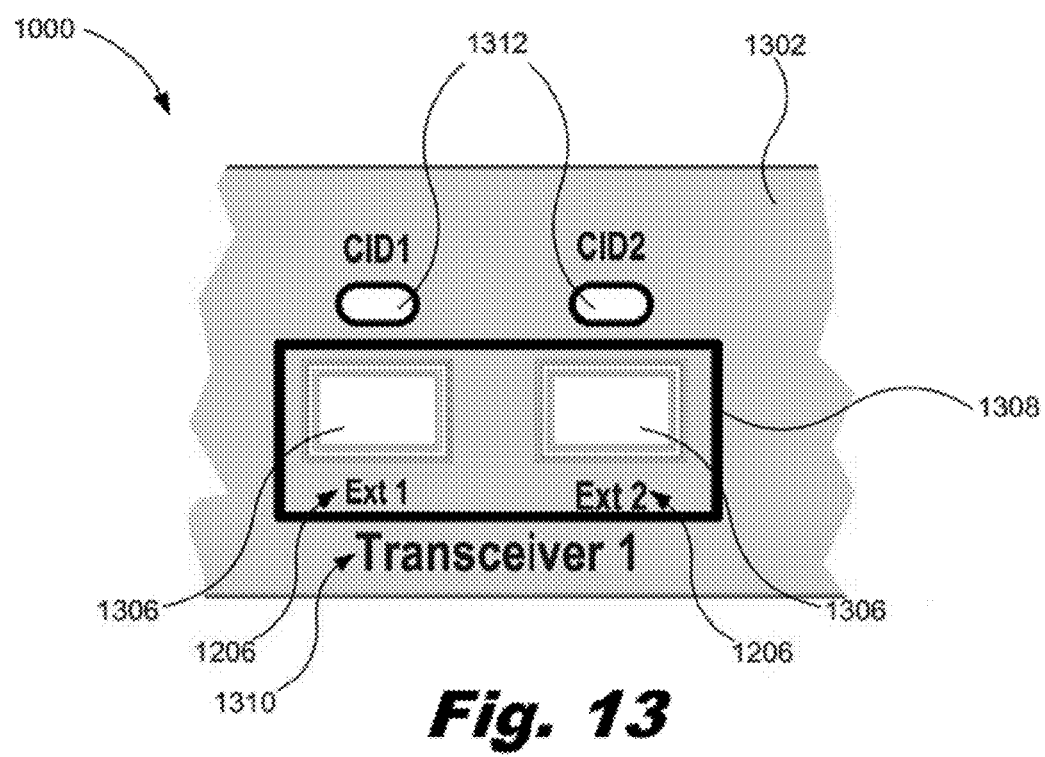
FIG. 13 is a view of a rear faceplate with a number of user interface elements, according to an example of the principles described herein.

Still further, throughout FIGS. 11, 12, and 13, the user interface elements located on the faceplate (1002) of the switch module (1000) may use colors, blinking of lights, presence or non-presence of lights, or combinations thereof to display to a user their respective indicia. For example, a component that is not functioning may be indicated with a red light or a light that is in the off state whereas a functioning component may be indicated with a green light or a light that is in the on state. Any combination of indicative actions may be used to display to a user an indicator's respective indicia. The user interface elements may be used for association of cables and transceiver module (102), where the user interface elements themselves may be exposed for user interaction or automatically actuated upon transceiver module (102) or cable installations. For transceiver module (102) with electrical blind-mate connectors, electrical signals may be used instead of electromechanical buttons.

As depicted in FIG. 11, the transceiver module status indicator (1102) indicates to a user that the transceiver module (102) associated with the transceiver module status indicator (1102) is or is not properly functioning. In one example, the transceiver module status indicator (1102) may utilize a number of light emitting diodes (LEDs) to display the color red when the associated transceiver module (102) is not functioning properly, and green when the transceiver module (102) is functioning properly. Other colors or indicators may be used to indication other statuses of the transceiver module (102). In another example, additional indicators may be presented to the user in association with the transceiver module status indicator (1102) to indicate whether a number of e/o engines associated with that transceiver module (102) are or are not functioning properly.

The cable connection status indicators (1104) indicate whether a cable such as the external waveguides (1012) is transferring signals through the external waveguides (1012). For example, the external waveguides (1012) may be coupled to the switch module (1000), but may not be transmitting data due to a failure in the external waveguides (1012) or for other reasons. In connection with the cable connection status indicators (1104), the CID button/indicator (1106) may be used to determine if a number of components along the signal transfer path have failed for one reason or another. In one example, the CID button/indicator (1106) may be actuated by a user, and the CD button/indicator (1106) would indicate to the user whether a cable such as the external waveguides (1012) were not properly coupled to the switch module (1000), whether a component such as an e/o engine has failed, whether a cable has failed, whether a component along the signal transfer path has failed, or combinations thereof.

The CID presence indicator (1108) indicates whether a transceiver module (102) has been properly coupled to the switch module (1000). For example, if the latching device (310) of a transceiver module (102) is not actuated after insertion of the transceiver module (102) into the switch module (1000), then the CID presence indicator (1108) may or may not light up indicating that the transceiver module (102) is not properly coupled to the switch module (1000). In the example, of FIG. 11, the CID presence indicator (1108) is in the form of a light ring surrounding the inserted transceiver module (102).

The faceplate (1002) switch module (1000) may also comprise a transceiver module label (1110). The transceiver module label (1110) indicates to a user which transceiver module (102) is associated with the slot it is inserted into or the user interface elements located on the faceplate (1002). In the example of FIG. 11, the transceiver module label (1110) indicates the location of "Transceiver 1."

FIG. 12 is a view of a front faceplate (1202) with a number of user interface elements, according to another example of the principles described herein. FIG. 13 is a view of a rear faceplate (1302) with a number of user interface elements, according to an example of the principles described herein. FIGS. 12 and 13 are described here together because the presence of one component on the front faceplate (1202) may affect a user interface element on the rear faceplate (1302), and visa versa. Also, by way of orientation with regard to the switch module (1000), the front faceplate (1202) may be located on a front side of the switch module (1000). In one example, the front side of the switch module (1000) is the left side of FIGS. 1, 2, and 9. In this example, the rear side of the switch module (1000) is the right side of FIGS. 1, 2, 9, and 10. The same orientation convention applies to FIG. 14 as will be described below.

The front faceplate (1202) comprises a transceiver module (102) engaged within the switch module (1000). Further, the front faceplate (1202) comprises a transceiver module status indicator (1102), a number of cable connection status indicators (1104), a CID button/indicator (1106), CID presence indicator (1108), and a transceiver module label (1110) as described above in connection with FIG. 11. The front faceplate (1202) may further comprise a number of cable presence indicators (1204). The cable presence indicators (1204) indicate whether a number of external cables such as, for example, the internal waveguides (112) or electrical cables are coupled to the switch module (1000). Specifically, if an external cable is coupled to and properly mounted with an external cable connector (1306) located on the rear faceplate (1302) of FIG. 13, then the respective cable presence indicator (1204) located on the front faceplate (1202) will indicate that that particular cable is coupled to the switch module (1000). Otherwise, the cable presence indicator (1204) will indicate that no external cable is coupled to the external cable connector (1306).

The cable presence indicators (1204) and external cable connector (1306) have corresponding external cable labels (1206) that indicate which external cable connector (1306) corresponds to which cable presence indicator (1204). For example, the front faceplate (1202) of FIG. 12 includes the external cable labels (1206) "Ext1" and "Ext2" that indicate external cable 1 and external cable 2. These external cable labels (1206) of the front faceplate (1202) indicate to a user which external cables are plugged into the external cable connector (1306) of the rear faceplate (1302). Corresponding external cable labels (1206) can be found on the rear faceplate (1302) of FIG. 13 to indicate where the external cables are to be coupled to the switch module (1000) in order to indicate on the cable presence indicators (1204) of the front faceplate (1202) which external cables are coupled to the switch module (1000).

FIG. 13 comprises a CID presence indicator (1308) indicates whether a transceiver module (102) has been properly coupled to the switch module (1000) as described above in connection with element 1108 of FIG. 11. In the example, of FIG. 13, the CID presence indicator (1308) is in the form of a light ring surrounding the inserted transceiver module (102). However, any form of indicator may be used.

The rear faceplate (1302) of FIG. 13 further comprises a number of CID button/indicators (1312). The CID button/indicators (1312) may be used to determine if a number of components along the signal transfer path have failed for one reason or another. In one example, the CID button/indicator (1312) may be actuated by a user, and the CID button/indicator (1312) would indicate to the user whether a number of transceiver modules (102) are mounted to the switch module (1000), whether a cable such as the external waveguides (1012) were not properly coupled to the switch module (1000), whether a component such as an e/o engine has failed, whether a cable has failed, whether a component along the signal transfer path has failed, or combinations thereof.

Generally speaking, the front faceplate (1202) of FIG. 12 and the rear faceplate (1302) of FIG. 13 assist a user or technician in understand the status of the various components within the switch module (1000). If a component is coupled to the front faceplate (1202), that fact is indicated on the rear faceplate (1302), and if a component is coupled to the rear faceplate (1302), that fact is indicated on the front faceplate (1202). This makes identifying functioning and nonfunctioning components simpler and quicker for a user or technician.

Figure 14:
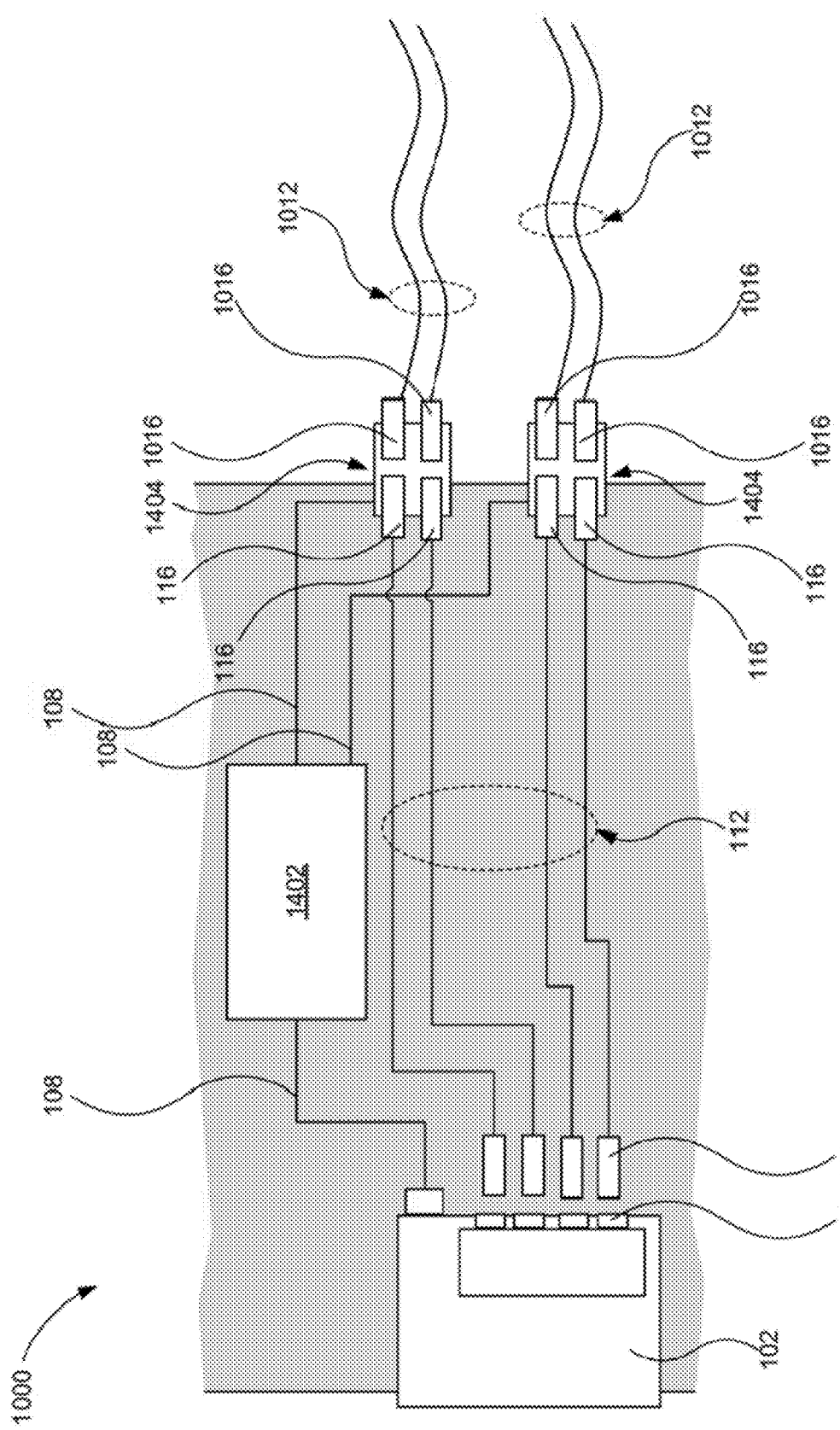
FIG. 14 is a top view of a management controller communicatively coupled to a transceiver module and a number of ferrule arrays, according to an example of the principles described herein.

FIG. 14 is a top view of a management controller (1402) communicatively coupled to a transceiver module (102) and a number of ferrule arrays (1404), according to an example of the principles described herein. As depicted in FIG. 14, the management controller (1402) is electrically coupled to the transceiver module (102) and a number of ferrule arrays (1404) via a conductive pathways (108). In one example, the transceiver module (102) is the transceiver module indicated in FIG. 11 as "Transceiver 1."

A number of external waveguides (1012) are coupled to a corresponding number of external ferrules (1016). In one example, the external waveguides (1012) and external ferrules (1016) make up the cables that are inserted into the external cable connectors (1306) of FIG. 13. The external ferrules (1016) are coupled to a corresponding number of internal ferrules (116). The internal ferrules (116) are optically coupled to the e/o engines (614) of the transceiver module (102) via a number of internal waveguides (112) and a corresponding number of transceiver module ferrules (1414).

The electrical signals from the transceiver module (102) as well as from the ferrule arrays (1404) are routed to and from the management controller (1402). The electrical signals from the transceiver module (102) may be used to indicate to the management controller (1402) that the transceiver module (102) is coupled to the switch module (1000). Also, the electrical signals from the ferrule arrays (1404) may be used to indicate to the management controller (1402) that a number of the external waveguides (1012) and corresponding external ferrules (1016) are coupled to the switch module (1000).

The specification and figures describe an optical/electrical signal transmission system. This system may comprises a number of processing devices mounted on a motherboard, and a number of transceiver modules comprising a number of e/o engines, in which the transceiver modules electrically couple to the processing devices without interrupting the processes of the system. A transceiver module may comprise a number of e/o engines to electrically couple to a number of processing devices mounted on a motherboard and optically couple to a number of waveguides, in which the e/o engines electrically couple to the processing devices mounted on a motherboard and optically couple to a number of waveguides. The transceiver module (102) is hot-swappable without the removal of a number of external waveguides (117).

This system and transceiver module may have a number of advantages, including: the ability to hide optical cables within a switch module in a way that they are not visible to the user. Further, the disposition of the optical cables in this manner increases cooling air flow through the switch module and lowers cost by using non-ruggedized optical fibers. Still further, the disposition of the optical cables in this manner adds to the neatness of the switch module and can reduce or eliminate potential human errors when servicing the switch module.

Even still further, the switch module can be flexibly designed to vary the numbers of e/o engines on the transceiver modules, optical ferrules and associated internal optical fiber configurations (e.g., 2-fiber, 4-fiber, and 8-fiber), external optical cable assemblies, and fibers within each external optical cable assembly. Further, the placement of a transceiver module and its corresponding external optical cables can also be flexibly designed.

The transceiver module may be mounted to the switch module at the front faceplate in order to improve serviceability. Similarly, external cables may be placed on the rear faceplate for better cable management and to support easier switch module serviceability without removing the external cables.

Other advantages may include a higher mean time between failures (MTBF) for the switch module as a whole as well as the components thereof including, for example, the transceiver modules, switch ASICs, leaf ASICs, and spine ASICs, among others. The reliability of the switch module is improved reliability when the switch printed circuit board (PCB) or motherboard does not have the e/o engines installed in the bare configuration model. Still further, the ability to physically place E/O engines in the switch module and computer blade modules independent of the ASICs' locations that the e/o engines are interfacing to enables potential higher lifetime reliability for the e/o engines due to the cooler ambient temperature.

Improvements in switch availability include the ability to service e/o engines without removing the switch module and preventing service outages due to switch removal. Further, external optical cables do not need to be removed to service the corresponding transceivers. This minimizes human errors such as accidently removing a wrong cable.

The present specification and drawings also provide a pay-as-you-go cost model system for customers where customers do not need to spend the cost for the e/o engines up front, but can purchase only the number of transceiver modules needed at that time. Further, optical cables can be preinstalled on the switch module's faceplate without needing the optical transceiver modules. Still further, additional transceiver modules can be added later as need arises.

Other advantages include a simpler and more efficient switch module design that routes internal optical cables under the switch motherboard. This allows for the optical cables to be neatly organized within the switch module, minimizes human errors in, for example, servicing the switch ASICs, minimizes air flow blockage on the top or component side of the switch motherboard, and uses unprotected optical fibers for cost efficiency.

Even still further, a lower cost to the consumer can be realized due to a higher level of integration. A transceiver module can support more than one internal or external optical cable, enabling the user to amortize the cost of the transceiver module.

Various internal optical cable configurations between the transceiver modules' optical blind-mate connectors and optical backplane connectors or faceplate connectors can be flexibly designed. The present specification allows for more flexible physical placement of transceiver modules and external cable connectors on the faceplate for efficient use of the faceplate space and ease of cable accessibility and more efficient thermal environment reasons. Also, the same-side (e.g., front/front, rear/rear) or opposite-side (e.g., front/rear) placement of e/o engines with respect to the cable connectors can also be flexibly designed.

The preceding description has been presented to illustrate and describe examples of the principles described. This description is not intended to be exhaustive or to limit these principles to any precise form disclosed. Many modifications and variations are possible in light of the above teaching.

What is claimed is:

1. An optical/electrical signal transmission system (100), comprising:
   a number of processing devices (106) mounted on a motherboard (104); and
   a number of transceiver modules (102) comprising a number of e/o engines (304);
   in which the transceiver modules (102) electrically couple to the processing devices (106) without interrupting the processes of the system (100).

2. The system (100) of claim 1, in which the transceiver modules (102) are serviceable independent of a number of external waveguides (117).

3. The system of claim 1, in which the electrical coupling of the e/o engines (304) to the processing devices (106) occurs along an axis perpendicular to an axis at which the e/o engines (304) optically couple to a number of internal waveguides (112).

4. The system of claim 1, in which the electrical coupling of the e/o engines (304) to the processing devices (106) occurs along an axis parallel to an axis at which the e/o engines (304) are optically coupled to a number of internal waveguides (112).

5. The system (100) of claim 1, in which the transceiver module (102) optically couples to the motherboard (104) on a side of the motherboard (104) opposite a side of the motherboard (104) comprising the processing devices (106), and electrically couples to the motherboard (104) on the same side of the motherboard (104) comprising the processing devices (106).

6. The system (100) of claim 1, in which the transceiver module (102) optically and electrically couples to the motherboard (104) on a side of the motherboard (104) opposite a side of the motherboard (104) comprising the processing devices (106).

7. The system (100) of claim 1, further comprising a number of internal waveguides (112) to transmit optical signals to the processing devices (106), in which the internal waveguides (112) are located on a side of the motherboard (104) opposite a side of the motherboard (104) comprising the processing devices (106).

8. A transceiver module (102) comprising:
   a number of e/o engines (304) that electrically couple to a number of processing devices (106) mounted on a motherboard (104) and optically couple to a number of internal waveguides (112);
   in which the e/o engines (304) electrically blind-mate couple to the processing devices (106) mounted on a motherboard (104) and optically blind-mate couple to a number of internal waveguides (112).

9. The transceiver module (102) of claim 8, in which the transceiver module (102) is hot-swappable without the removal of a number of external waveguides (117).

10. The transceiver module (102) of claim 8, in which the electrical coupling of the e/o engines (304) to the processing devices (106) occurs along an axis parallel to the axis at which the e/o engines (304) are optically coupled to the internal waveguides (112).

11. An optical/electrical signal transmission system (100), comprising:
  a number of transceiver modules (102) comprising:
   a number of e/o engines (304) to electrically couple to a number of processing devices (106) mounted on a motherboard (104) and optically couple to a number of internal waveguides (112), and
   a number of diagnostic elements (1102, 1104, 1106, 1108) that indicate a status of the optical/electrical signal transmission system (100).

12. The optical/electrical signal transmission system (100) of claim 11, in which the diagnostic elements (1102, 1104, 1106, 1108) indicate that the transceiver modules (102), internal waveguides (112), a number of external waveguides (117), or combinations thereof are coupled to the optical/electrical signal transmission system (100).

13. The optical/electrical signal transmission system (100) of claim 11, in which the diagnostic elements (1102, 1104, 1106, 1108) indicate that the transceiver modules (102), internal waveguides (112), a number of external waveguides (117), or combinations thereof are functioning.

14. The optical/electrical signal transmission system (100) of claim 11, in which the diagnostic elements (1102, 1104, 1106,) comprise a connector/cable identification (CID) button/indicator (1106) that indicates whether a number of components along a signal transfer path are functioning.

15. The optical/electrical signal transmission system (100) of claim 11, in which the diagnostic elements (1102, 1104, 1106, 1108) comprise a number of transceiver module status indicators (1102) that indicate the functional status of a respective one of the transceiver modules (102).

\* \* \* \* \*